(12) United States Patent
Chiba et al.

(10) Patent No.: US 11,247,654 B2
(45) Date of Patent: Feb. 15, 2022

(54) ELECTRICAL COMPONENT ASSEMBLY AND VEHICULAR BRAKE FLUID PRESSURE CONTROL DEVICE

(71) Applicants: HITACHI ASTEMO, LTD., Hitachinaka (JP); Veoneer Nissin Brake Systems Japan CO., LTD., Yokohama (JP)

(72) Inventors: Kentaro Chiba, Tomi (JP); Takaaki Komaba, Yokohama (JP)

(73) Assignees: Hitachi Astemo, Ltd., Ibaraki (JP); Veoneer Nissin Brake Systems Japan Co., Ltd., Kanagawa (JP)

( * ) Notice: Subject to any disclaimer, the term of this patent is extended or adjusted under 35 U.S.C. 154(b) by 170 days.

(21) Appl. No.: 16/486,667

(22) PCT Filed: Feb. 16, 2018

(86) PCT No.: PCT/JP2018/005538
§ 371 (c)(1),
(2) Date: Aug. 16, 2019

(87) PCT Pub. No.: WO2018/151264
PCT Pub. Date: Aug. 23, 2018

(65) Prior Publication Data
US 2020/0055508 A1 Feb. 20, 2020

(30) Foreign Application Priority Data

Feb. 17, 2017 (JP) .............................. JP2017-028531

(51) Int. Cl.
*B60T 17/02* (2006.01)
*B60T 15/02* (2006.01)
(Continued)

(52) U.S. Cl.
CPC ............ *B60T 15/028* (2013.01); *B60T 17/02* (2013.01); *F16K 27/041* (2013.01); *F16K 27/10* (2013.01); *F16K 31/046* (2013.01); *F16K 31/047* (2013.01)

(58) Field of Classification Search
CPC .... F16K 31/046; B60T 15/021; B60T 15/025; B60T 15/028; B60R 16/0239
(Continued)

(56) References Cited

U.S. PATENT DOCUMENTS 5,513,905 A * 5/1996 Zeides ................ B60R 16/0239
                                                 303/113.1
5,892,659 A * 4/1999 Cooper .................... H05K 7/12
                                                 361/727
(Continued)

FOREIGN PATENT DOCUMENTS

CN          103158688 A      6/2013
JP          2000-223856 A    8/2000
(Continued)

OTHER PUBLICATIONS

PCT/ISA/210 from International Application PCT/JP2018/005538 with the English translation thereof.
(Continued)

*Primary Examiner* — Christopher P Schwartz
(74) *Attorney, Agent, or Firm* — Carrier Blackman & Associates, P.C.; William D. Blackman; Joseph P. Carrier

(57) ABSTRACT

An electrical component assembly suitably prevents electrical components from coming off, while adopting a simple structure of connection by a connection terminal to a control board. The electrical component assembly includes a housing in which the electrical components are assembled, and the electrical components and the housing are fixed to a surface of a base body. The electrical component includes a
(Continued)

connection terminal to be press-contacted into a through hole of a substrate of the housing. The electrical component is provided with an electrical component adhesion margin facing said surface of the base body, so as to be fixed to the base body by an adhesive interposed between the base body and the electrical component adhesion margin.

9 Claims, 21 Drawing Sheets

(51) Int. Cl.
*F16K 27/04* (2006.01)
*F16K 27/10* (2006.01)
*F16K 31/04* (2006.01)

(58) Field of Classification Search
USPC .......... 303/119.1–119.3; 251/129.09, 129.15
See application file for complete search history.

(56) References Cited

U.S. PATENT DOCUMENTS

| | | | | |
|---|---|---|---|---|
| 6,124,772 | A * | 9/2000 | Heise | B60R 16/0239 |
| | | | | 303/119.2 |
| 6,863,254 | B2 * | 3/2005 | Altenrenger | H01F 7/08 |
| | | | | 251/129.09 |
| 8,220,878 | B2 * | 7/2012 | Yoshinaga | B60T 8/368 |
| | | | | 303/119.3 |
| 10,940,848 | B2 * | 3/2021 | Chiba | B60T 15/025 |
| 2008/0185547 | A1 * | 8/2008 | Tsuruta | F16K 27/003 |
| | | | | 251/129.15 |
| 2012/0298897 | A1 | 11/2012 | Nakamura et al. | |
| 2013/0153799 | A1 | 6/2013 | Ogawa et al. | |
| 2018/0170333 | A1 * | 6/2018 | Sagayama | B60T 8/3675 |
| 2019/0359193 | A1 * | 11/2019 | Chiba | B60T 15/028 |
| 2020/0055507 | A1 * | 2/2020 | Komaba | B60T 8/363 |

FOREIGN PATENT DOCUMENTS

| | | |
|---|---|---|
| JP | 2004-090847 A | 3/2004 |
| JP | 2006-156217 A | 6/2006 |
| JP | 2012-056391 A | 3/2012 |
| JP | 2012-241845 A | 12/2012 |
| JP | 2013-071491 A | 4/2013 |
| JP | 5261223 B2 | 8/2013 |
| JP | 2014-061755 A | 4/2014 |
| WO | 2016/203333 A1 | 12/2016 |

OTHER PUBLICATIONS

Written Opinion (PCT/ISA/237) from International Application PCT/JP2018/005538.
Office Action, dated Jan. 29, 2021, issued over the corresponding Chinese Patent Application No. 201880012678.8 with the English translation thereof.
Office Action issued over the corresponding Chinese Patent Application 201880012678.8, dated Jun. 23, 2020, and the English translation thereof.

* cited by examiner

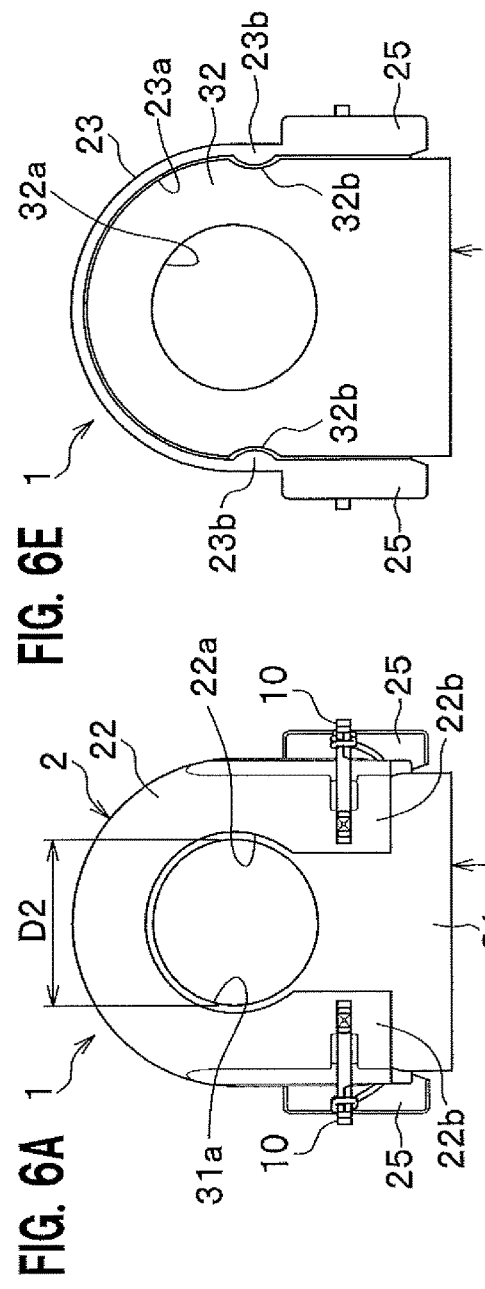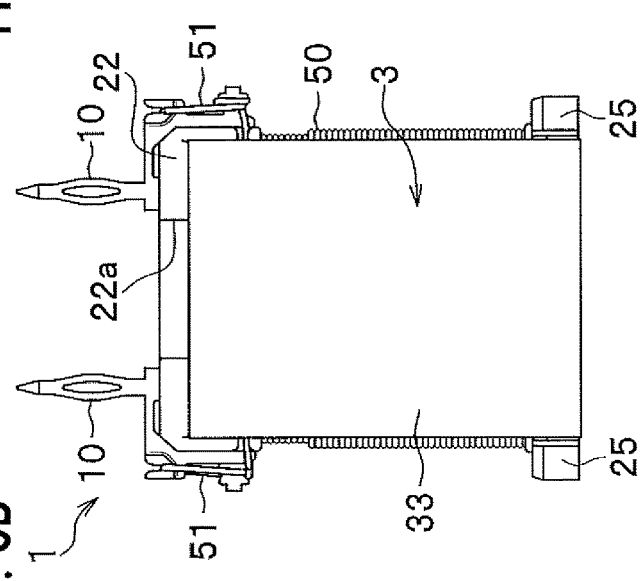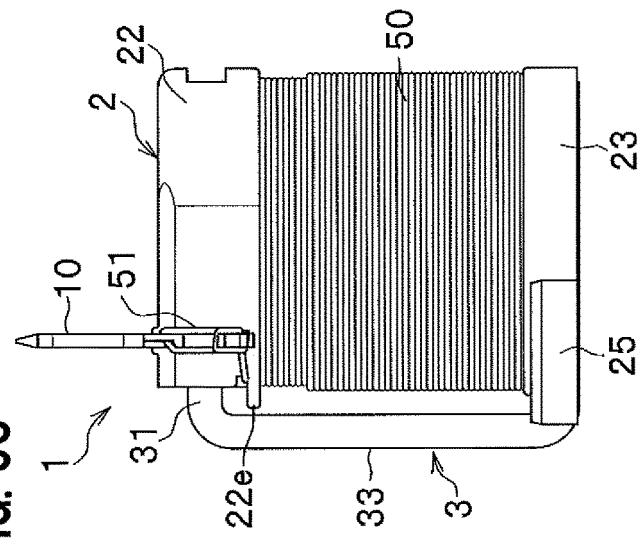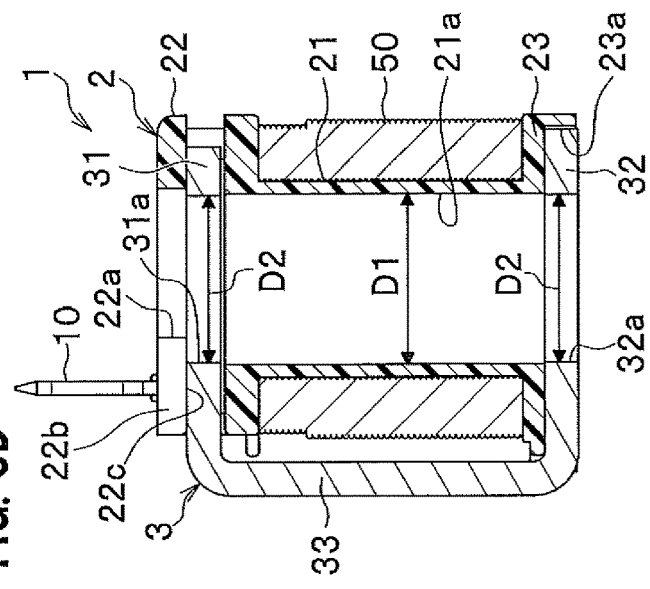

FIG. 7A  FIG. 7B  FIG. 7C
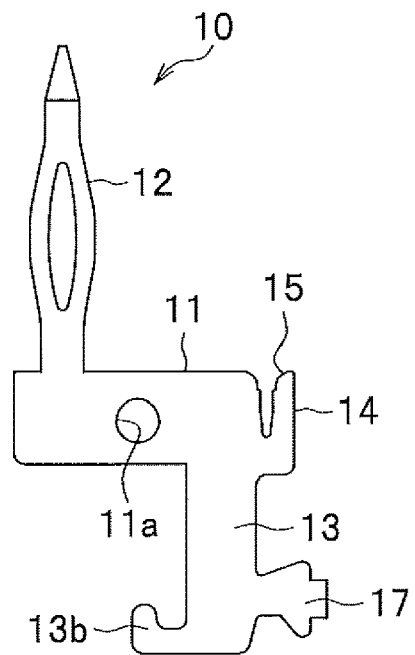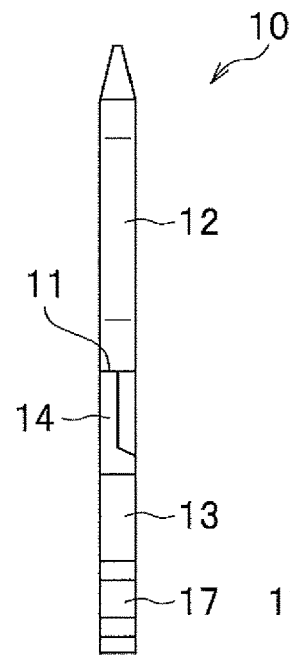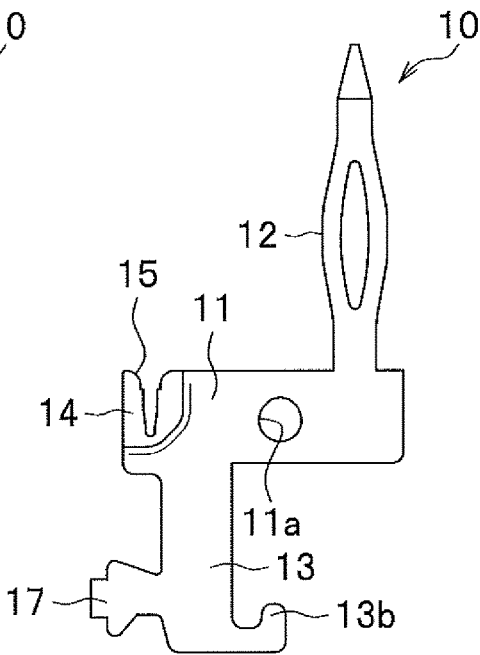
FIG. 7D
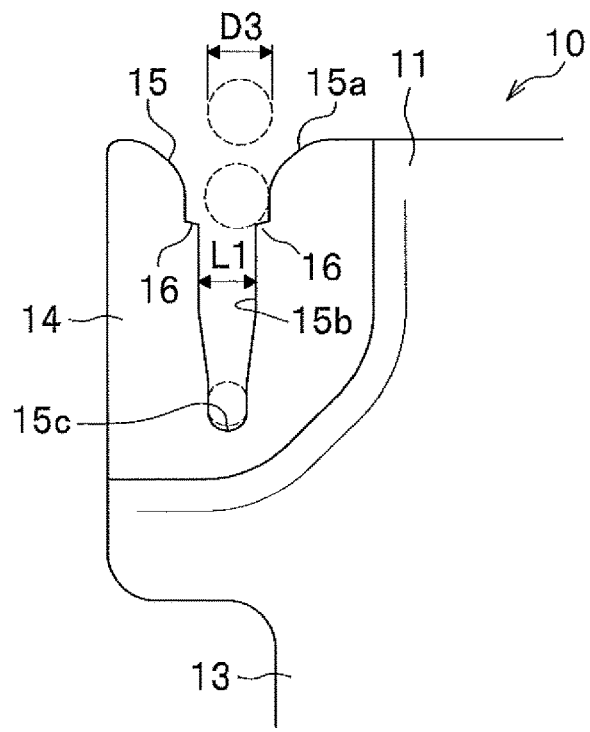

FIG. 17A
FIG. 17B
FIG. 17C
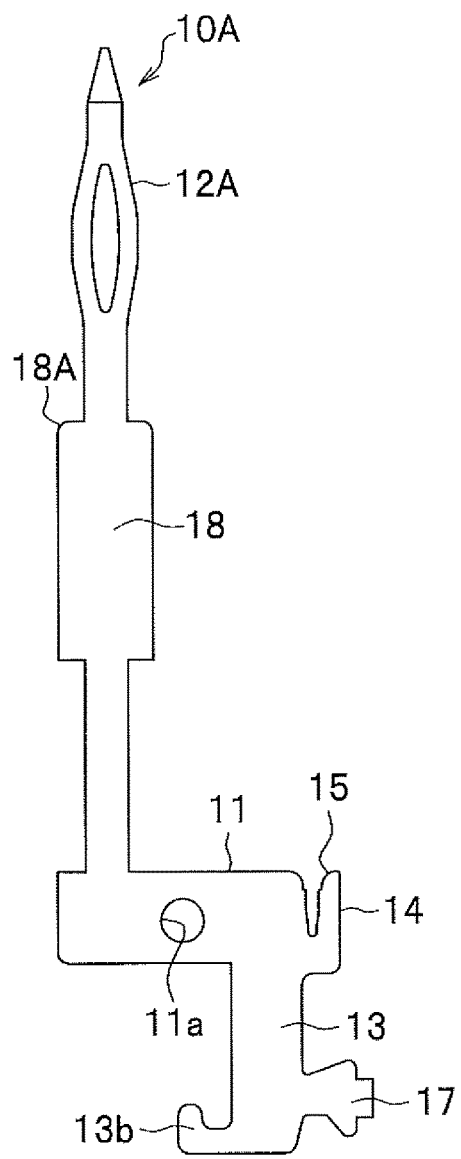
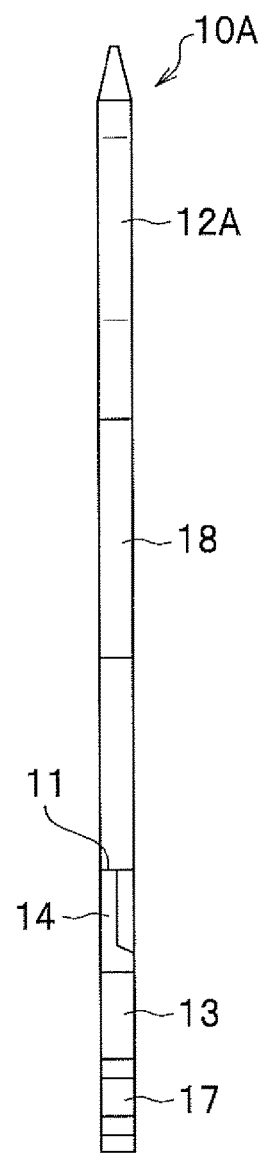
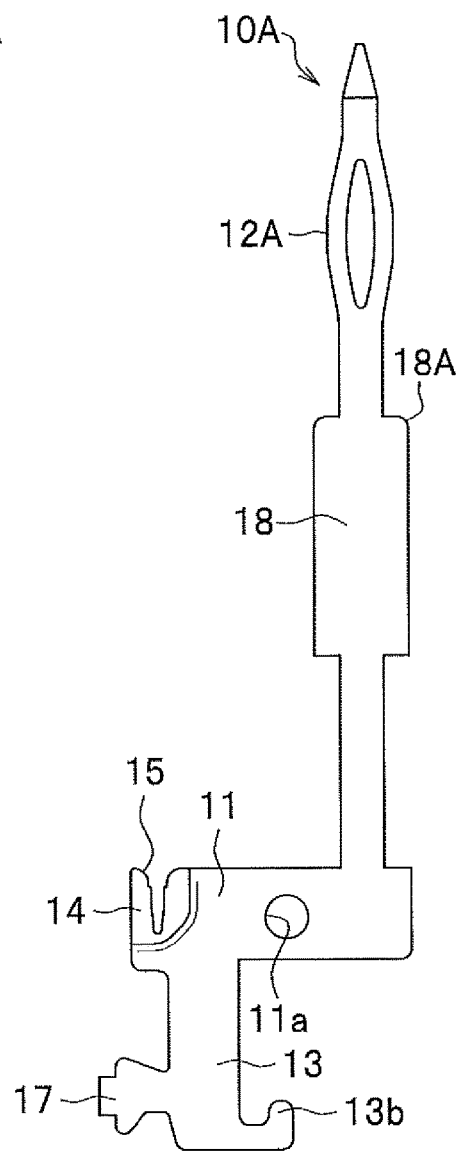

ELECTRICAL COMPONENT ASSEMBLY AND VEHICULAR BRAKE FLUID PRESSURE CONTROL DEVICE

TECHNICAL FIELD

The present invention relates to an electrical component assembly and a vehicular brake fluid pressure control device.

BACKGROUND OF THE INVENTION

A brake system of a vehicle, such as a two-wheeled vehicle and a four-wheeled vehicle, may include a vehicular brake fluid pressure control device for controlling the brake fluid pressure applied to wheel brakes, as is well known. Such a vehicular brake fluid pressure control device may include a base body formed therein with a brake fluid passage, and a solenoid valve attached to a surface of the base body. The surface of the base body has an electrical component assembly attached thereto, where the electrical component assembly includes a coil assembly as an electrical component mounted onto the solenoid valve, and a housing to cover the coil assembly. The coil assembly is connected to a control board disposed within the housing. In such a vehicular brake fluid pressure control device, the control board controls energizing the coil assembly so as to open/close the solenoid valve, to change the brake fluid pressure in the brake fluid passage for controlling braking force of the wheel brake.

The coil assembly includes a yoke, a bobbin disposed in the yoke, and a coil wound around the bobbin. A press-fit terminal is well known as a connection terminal to be connected to the coil, as shown in Japanese Patent No. 5261223, for example. The press-fit terminal is press-contacted into an insertion hole of the control board to electrically connect the coil assembly with the control board. In addition, such a structure is also under study that an electrical component such as a coil assembly is fixed to a housing only through connection by a press-fit terminal or the like, in order to simplify the assembling.

SUMMARY OF THE INVENTION

Problems to Be Solved

However, the structure of fixing the electrical component such as the coil assembly to the housing only through connection by a connection terminal such as the press-fit terminal may have following problems. For example, if an excessive external force acts on the press-fit terminal in the connection direction thereof, the terminal portion press-contacted to the control board may be bent to let the electrical component such as the coil assembly come off the control board.

The present invention provides an electrical component assembly and a vehicular brake fluid pressure control device that solve the above-identified problems to suitably prevent an electrical component from coming off, while adopting a simple structure of connection by connection terminals to a control board.

Solution to Problems

In order to solve the above-identified problems, the present invention provides an electrical component assembly that includes an electrical component and a housing in which electrical components are assembled, wherein the electrical components and the housing are fixed to a surface of a base body. The electrical component includes a connection terminal to be press-contacted into a throughhole of a substrate provided in the housing. The electrical component is provided with an electrical component adhesion margin facing said surface of the base body, so as to be fixed to the base body by an adhesive interposed between the base body and the electrical component adhesion margin.

In the electrical component assembly of the present invention, the electrical component is directly fixed to the body at a predetermined location by the adhesive interposed between the body and the electrical component adhesion margin. Accordingly, the connection terminal is accurately disposed at the predetermined location, and the connection terminal is easily connected to the control board. This allows for suitably preventing the electrical component from coming off, while adopting the simple structure of connection by the connection terminal to the control board.

In the electrical component assembly described above, the housing may include a housing adhesion margin facing said surface of the base body, so as to be adhered to the base body via the housing adhesion margin. This configuration allows the housing to be directly fixed to the base body at a predetermined location by the adhesive interposed between the base body and the housing adhesion margin of the housing. This allows the connection terminal to be more accurately disposed at the predetermined location, in combination with the electrical component being directly fixed by the adhesive to the base body, to have the connection terminal easily connected to the control board. Then, the electrical component is suitably prevented from coming off, while the simple structure is adopted for connection by a connection terminal to the control board.

In the electrical component assembly described above, in a case where the direction of the connection terminal being inserted into the throughhole is the same as that of the electrical component being assembled to the housing, the electrical component is provided on the outer surface thereof, perpendicular to the direction of said assembling, with a protruding rib to be press-fitted into a groove of the housing. The electrical component adhesion margin may be formed to include at least a part of the rib. With this configuration, the rib is fitted into the groove to have the electrical component positioned and fixed to the housing. This allows the connection terminal to be accurately disposed at the predetermined location of the housing, to make positioning of the connection terminal easy. Accordingly, the connection terminal is easily connected to the control board. Additionally, forming the electrical component adhesion margin so as to include at least a part of the rib allows the electrical component to be fixed to the base body, without any separately-provided electrical component adhesion margin. Then, the electrical component can be reduced in size.

In the electrical component assembly described above, the connection terminal may be a press-fit terminal. This configuration allows the connection terminal to be connected with the control board more easily, to improve assembling efficiency.

In the electrical component assembly described above, the electrical component is a coil assembly to drive a solenoid valve. The coil assembly may include a bobbin, a coil having a winding around the bobbin, a yoke attached to the bobbin, and the connection terminal electrically connected to the winding. As described above, the electrical component assembly is preferably a coil assembly to drive a solenoid valve.

The present invention provides a vehicular brake fluid pressure control device that includes the above-described electrical component assembly, and is connected between a master cylinder and a wheel brake to control brake fluid pressure acting on the wheel brake. The vehicular brake fluid pressure control device has the solenoid valve attached to the base body, and has the coil assembly attached to the solenoid valve.

The vehicular brake fluid pressure control device of the present invention allows the electrical component to be fixed at a predetermined location of the housing, and allows the connection terminal to be accurately disposed at a predetermined location of the housing. Then, assembling efficiency is improved to reduce costs.

Advantageous Effects of the Invention

The electrical component assembly and the vehicular brake fluid pressure control device of the present invention suitably prevents the electrical component from coming off, while adopting a simple structure of connection by the connection terminal to the control board.

BRIEF DESCRIPTION OF DRAWINGS

FIG. 5A is a perspective view from a viewpoint for a yoke being attached, and FIG. 5B is an enlarged perspective view to show a press-fit terminal and its vicinity;

FIGS. 6A to 6E also show the coil assembly, with a side of the yoke being attached as a rear surface, where FIG. 6A is a plan view, FIG. 6B is a rear view, FIG. 6C is a right side view, FIG. 6D is a longitudinal sectional view, and FIG. 6E is a bottom view;

FIGS. 7A to 7D show a press-fit terminal as a component of the coil assembly of the first embodiment, where FIG. 7A is a front view, FIG. 7B is a left side view, FIG. 7C is a rear view, and FIG. 7D is an enlarged rear view of a key portion;

FIG. 8A is a partial perspective view of the coil assembly being assembled to the housing, and FIG. 8B is that of the coil assembly after the assembling;

FIG. 16A is a perspective view from a viewpoint for the yoke being attached, and FIG. 16B is an enlarged perspective view of the press-fit terminal and its vicinity;

FIGS. 17A to 17C show the press-fit terminal of the second embodiment, where FIG. 17A is a front view, FIG. 17B is a left side view, and FIG. 17C is a rear view;

FIG. 18A is a partial perspective view of the coil assembly being assembled to the housing, and FIG. 18B is that of the coil assembly after the assembling;

EMBODIMENTS OF THE INVENTION

Hereinafter, embodiments of the present invention will be described in detail with reference to the drawings as appropriate. In the following description, a front-rear direction and an up-down direction of a vehicular brake fluid pressure control device are referenced to those shown in FIG. 1, and a right-left direction is referenced to that shown in FIG. 3. In addition, the front-rear direction, right-left direction, and up-down direction of the coil assembly as an electrical component are referenced to those shown in FIG. 5A, but there is no intension to limit a direction of assembling the coil assembly with respect to the vehicular brake fluid pressure control device.

First Embodiment

In the present embodiment, a description will be given of a case where the electrical component assembly of the present invention is applied to a vehicular brake fluid pressure control device for a two-wheeled vehicle provided with two brake systems, as an example. Of course, the present invention may be applied to a vehicular brake fluid pressure control device for a four-wheeled vehicle.

<Configuration of Vehicular Brake Fluid Pressure Control Device>

Figure 1:
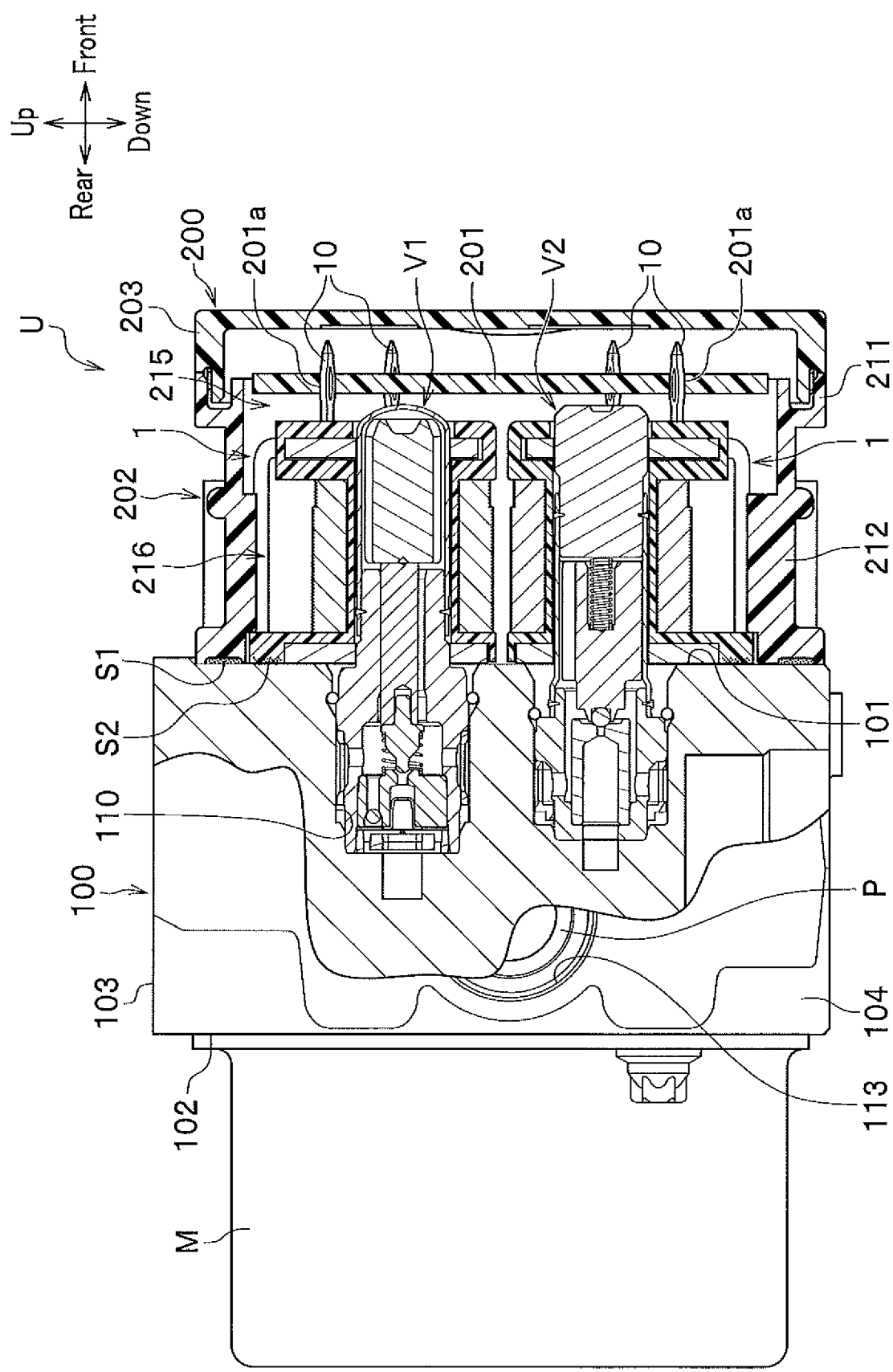
FIG. 1 is a side sectional view of a vehicular brake fluid pressure control device including an electrical component assembly according to a first embodiment of the present invention.
Figure 2:
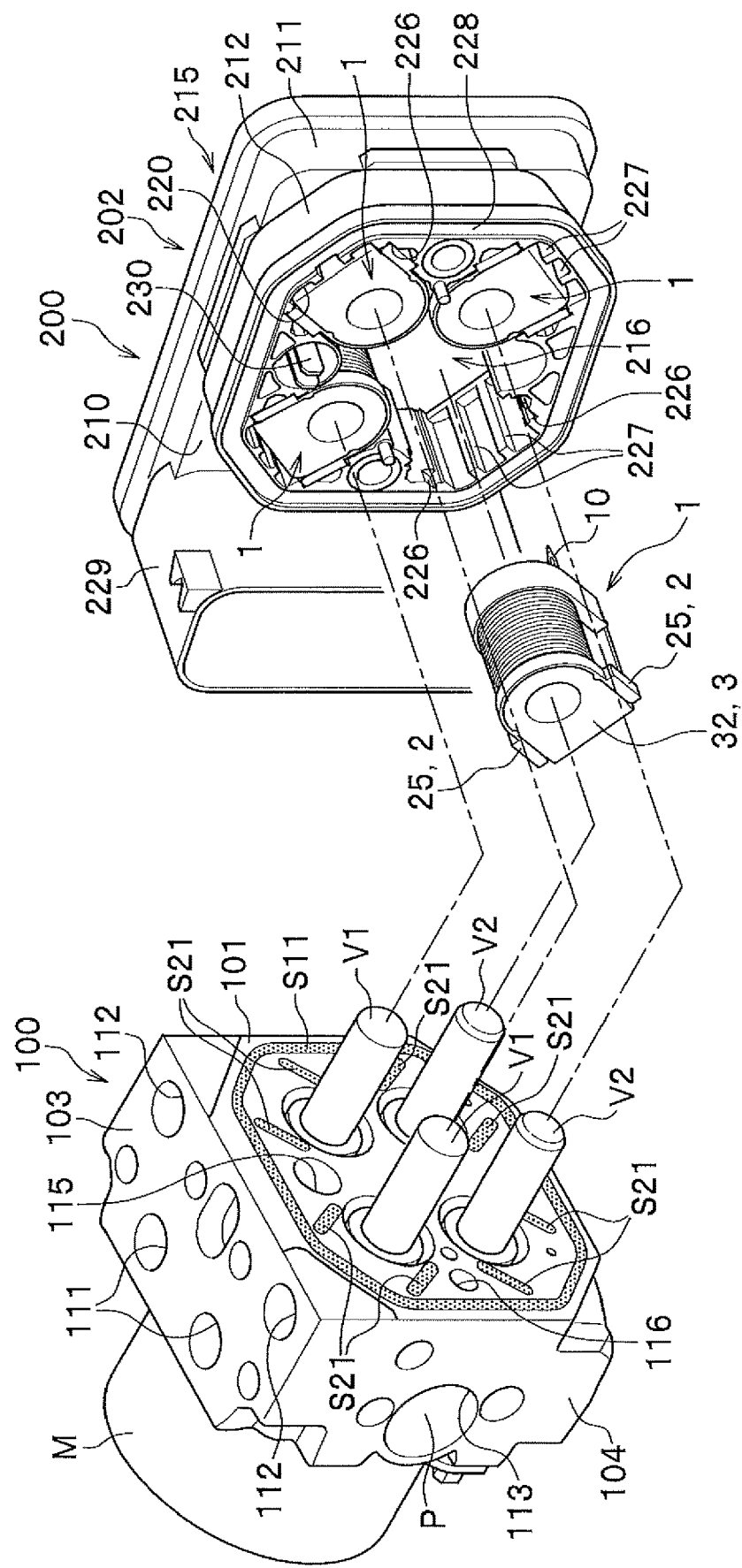
FIG. 2 is an exploded perspective view of the vehicular brake fluid pressure control device as shown in FIG. 1.

A vehicular brake fluid pressure control device U is connected between a master cylinder (not shown) and a wheel brake to control the brake fluid pressure acting on the wheel brake. As shown in FIGS. 1 and 2, the vehicular brake fluid pressure control device U includes a base body 100 to which solenoid valves V1, V2 for two brake systems, a motor M, a reciprocating pump P, and the like are assembled. Additionally, the vehicular brake fluid pressure control device U includes an electronic control unit 200 as an electrical component assembly provided with a control board 201 as an electrical component that detects behaviors of a vehicle body to control opening/closing of the solenoid valves V1, V2 and driving of the motor M. The base body 100 can have various sensors, such as a pressure sensor, assembled thereto, in addition to the solenoid valves V1, V2. The base body 100 is formed therein with a brake fluid passage (an oil passage) which is not shown. The vehicular brake fluid pressure control device U is configured to cause the control board 201 to drive the solenoid valves V1, V2 and the motor M based on behaviors of the vehicle body to change the brake fluid pressure in the brake fluid passage.

<Configuration of Base Body>

The base body 100 is a metal part formed in a substantially rectangular parallelepiped (see FIG. 2), and is formed therein with a brake fluid passage (oil passage) which is not shown. A front surface 101 as one surface of the base body 100 is formed therein with a plurality of bottomed mounting holes 110, in which the solenoid valves V1, V2 are mounted, and the like. Note that the number of solenoid valves V1, V2 to be used varies depending on a type of the target vehicle, such as a four-wheeled vehicle, and difference in function of the vehicular brake fluid pressure control device U, for example. The solenoid valves V1, V2 of the present embodiment each have a coil assembly 1, as an electrical component, mounted thereon. The solenoid valve V1 is a normally-open solenoid valve, for example. The solenoid valve V2 is a normally-closed solenoid valve, for example. Each coil assembly 1 is electrically connected to the control board 201 using press-fit terminals 10, as described later.

As shown in FIG. 2, an upper surface 103 of the base body 100 is formed therein with an inlet port 111, an outlet port 112, and the like, to which pipes leading to a wheel brake (not shown) are connected. In addition, a lower surface of the base body 100 is formed therein with a reservoir hole, in which a reservoir component (not shown) constituting a reservoir is assembled, and the like. Further, a side surface 104 of the base body 100 is formed therein with a pump hole 113, in which the reciprocating pump P is mounted, and the like. Note that the holes provided in the base body 100 communicate with one another, either directly or through the brake fluid passage (not shown) formed inside the base body 100.

<Configuration of Motor>

The motor M is an electrical component as a power source of the reciprocating pump P. The motor M is integrally fixed to the rear surface 102 as the other surface of the base body 100. The motor M drives the reciprocating pump P. The motor M has a motor bus bar (not shown), for supplying power to a rotor, connected thereto. The motor bus bar is inserted into a terminal hole 115 (see FIG. 2) of the base body 100 and electrically connected to the control board 201 (see FIG. 1, the same shall apply hereafter) through a bus bar terminal 230 (see FIGS. 2 and 4) of the electronic control unit 200. The bus bar terminal 230 has a press-fit terminal (not shown) connected thereto so as to protrude toward the front side. The motor bus bar connected to the bus bar terminal 230 is electrically connected to the control board 201 via said press-fit terminal.

<Configuration of Electronic Control Unit>

The electronic control unit 200 includes the coil assembly 1, the control board 201, a housing 202, and a lid 203. The coil assembly 1 is fixed to the housing 202 by press-fitting as described later. The housing 202 houses the coil assembly 1 and the control board 201, and also houses the solenoid valves V1, V2, protruding from the base body 100, and the motor bus bar (not shown). Details will be described later on the structure of mounting the coil assembly 1 to the housing 202.

The control board 201 is formed to have electronic components, such as a semiconductor chip, attached on a substantially rectangular substrate printed with an electric circuit. The control board 201 is formed with a plurality of throughholes 201a in which the press-fit terminals 10 provided in the coil assembly 1 are press-fitted. The control board 201 executes control based on information obtained such as from sensors (not shown) provided in the vehicle, or a program stored in advance. Specifically, the control board 201 regulates the coil assembly 1 (see FIG. 2) and the motor M being energized, to control opening/closing the solenoid valves V1, V2 and driving the motor M. The sensors include various types of those, such as an angular velocity sensor and an acceleration sensor.

<Configuration of Housing>

The housing 202 is a box integrally fixed to the front surface 101 of the base body 100 in a state of covering the solenoid valves V1, V2 and the like protruding from the front surface 101 of the base body 100, as shown in FIG. 1. The housing 202 is integrally formed of a resin material. The housing 202 has the control board 201 and the coil assembly 1 assembled thereto. A front surface, on an opposite side from the base body 100, and a rear surface, facing the base body 100, of the housing 202 are open.

The housing 202 includes a plate-like bottom 210, a first peripheral wall portion 211 provided on the front side of the bottom 210, and a second peripheral wall 212 provided on the rear side of the bottom 210, as shown in FIG. 2. The bottom 210 has a substantially rectangular outer shape. The first peripheral wall 211 extends forward from the peripheral edge of the bottom 210, to have an outer periphery in a substantially rectangular shape. The first peripheral wall 211 defines a first housing chamber 215 (see FIG. 1) to house therein the control board 201 in a substantially rectangular shape.

Figure 3:
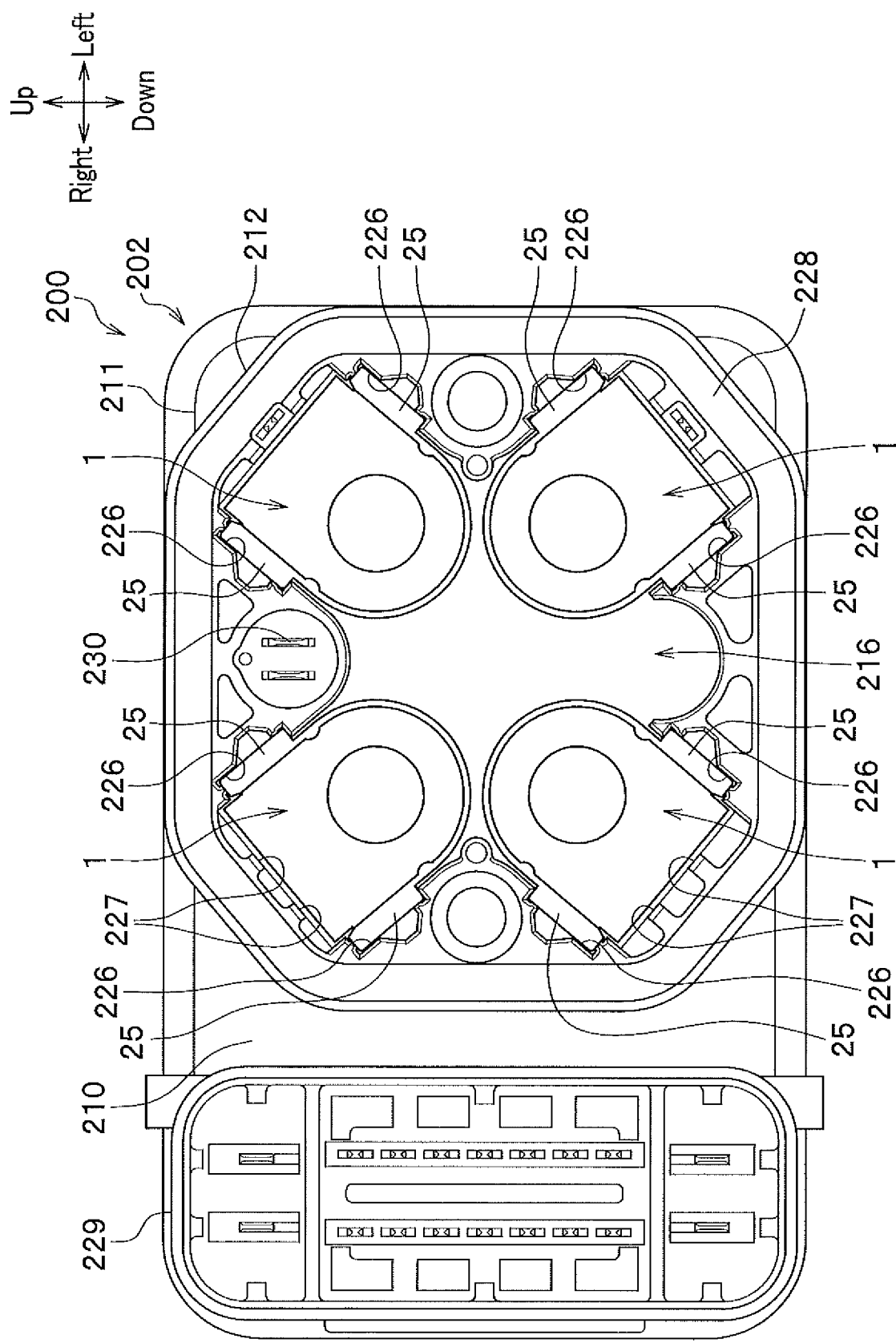
FIG. 3 is a rear view of the electrical component assembly of the first embodiment.

The second peripheral wall 212 extends rearward from the rear surface of the bottom 210, to have an outer periphery in a substantially octagonal shape. The second peripheral wall 212 defines a second housing chamber 216 (see FIG. 1) to house therein the coil assembly 1. The first housing chamber 215 and the second housing chamber 216 communicate with each other, as shown in FIGS. 1 and 3. In other words, no partition walls are present between the first housing chamber 215 and the second housing chamber 216. The housing 202 has a structure having no partition walls, as described above, so that the coil assembly 1 is disposed to run through the second housing chamber 216 into the first housing chamber 215, as shown in FIG. 1. This allows the housing 202 to suitably house the coil assembly 1, while being reduced in size in the front-rear direction.

Figure 4:
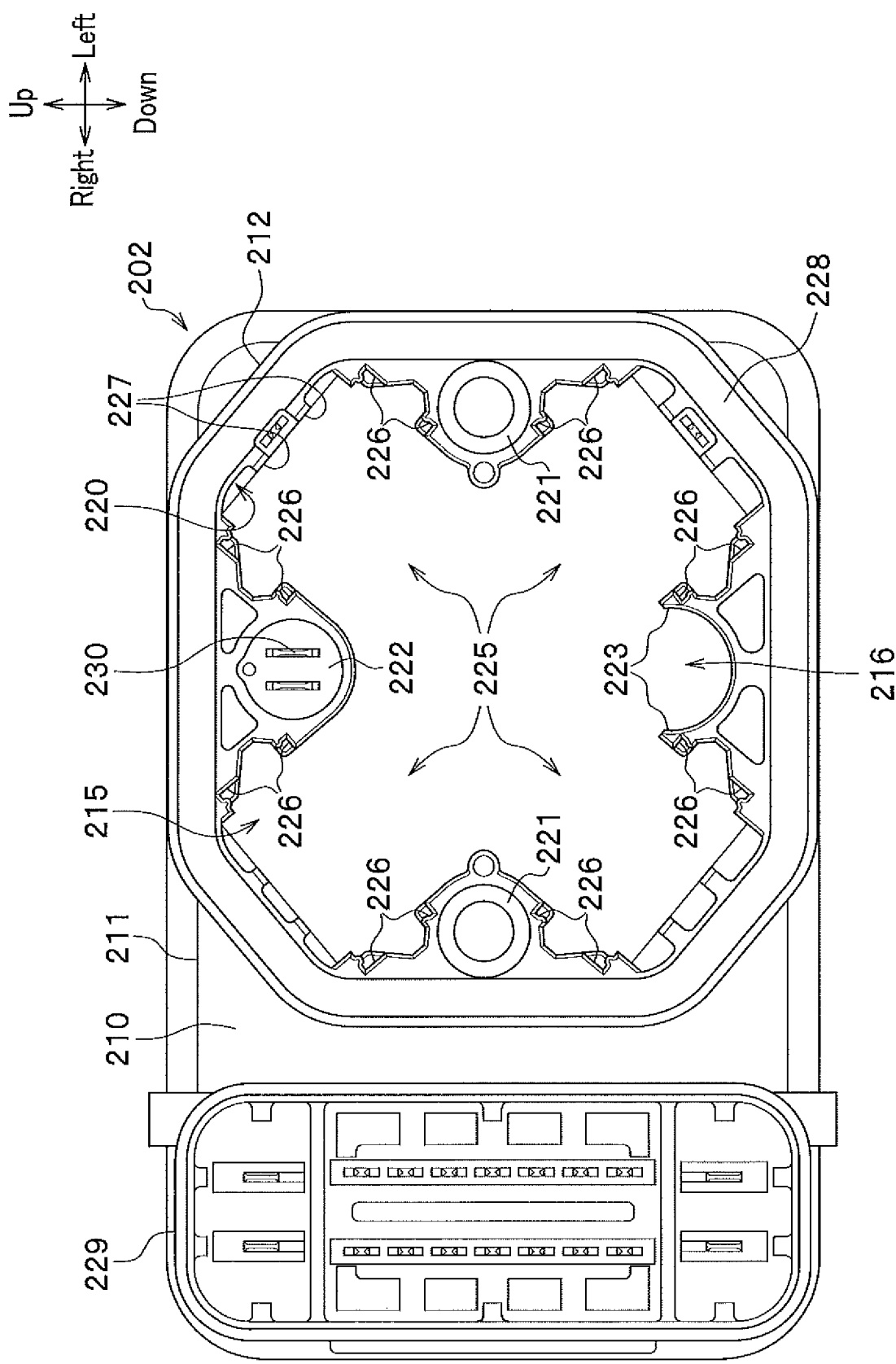
FIG. 4 is a rear view of a housing as a component of the electrical component assembly of the first embodiment.
Figure 8A:
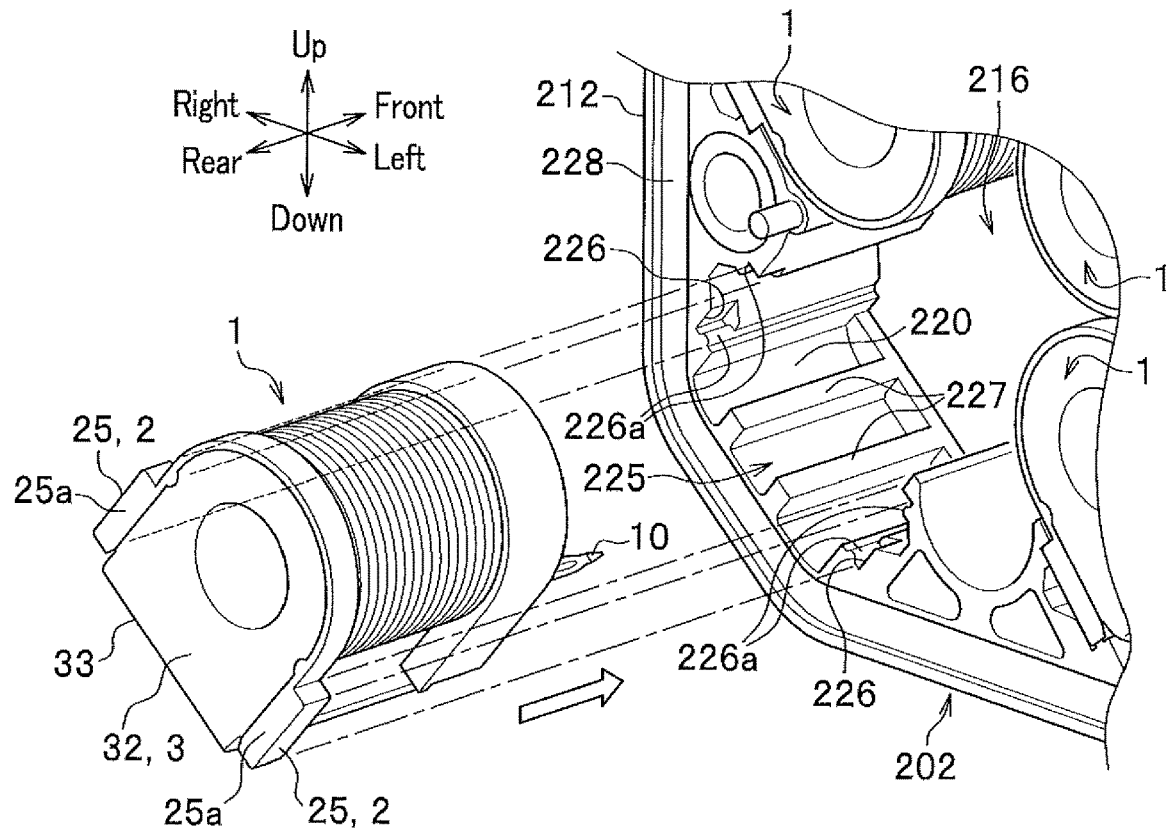
FIGS. 8A and 8B show the electrical component assembly of the first embodiment, where

The second peripheral wall 212 is formed in the inner surface thereof with a holding wall 220 in a concavo-convex shape, as shown in FIG. 4. The holding wall 220 includes bosses 221 protruding inward from the right and left sides of the second housing chamber 216, a terminal boss 222 protruding inward from the upper side of said chamber, and a holding boss 223 protruding inward from the lower side of said chamber. The holding wall 220 defines, inside thereof, four mounting spaces 225 to mount the coil assembly 1, between the terminal boss 222 and the adjacent bosses 221 and between the holders 223 and the adjacent bosses 221. The inner surface shapes of the holding walls 220 in the mounting spaces 225 are similar to one another, and are formed in a shape to follow the outer surface of the coil assembly 1. Each mounting space 225 is provided at an opening end thereof with a pair of grooves 226 in a concave shape to position and fix the coil assembly 1 in the mounting space 225. The grooves 226 in each mounting space 225 are formed at opposed portions of the oppositely disposed holding wall 220. As shown in FIG. 8A, each groove 226 is formed in an inner surface thereof with a protrusion 226a to effect press-fitting at the time of assembly. The protrusion 226a protrudes toward the inside of the groove 226 so as to abut on a rib 25 (see FIG. 8B) to be inserted into the groove 226 as described later. Note that reinforcing ribs 227 are formed on the inner surface of the holding wall 220, as shown in FIG. 2.

Figure 10:
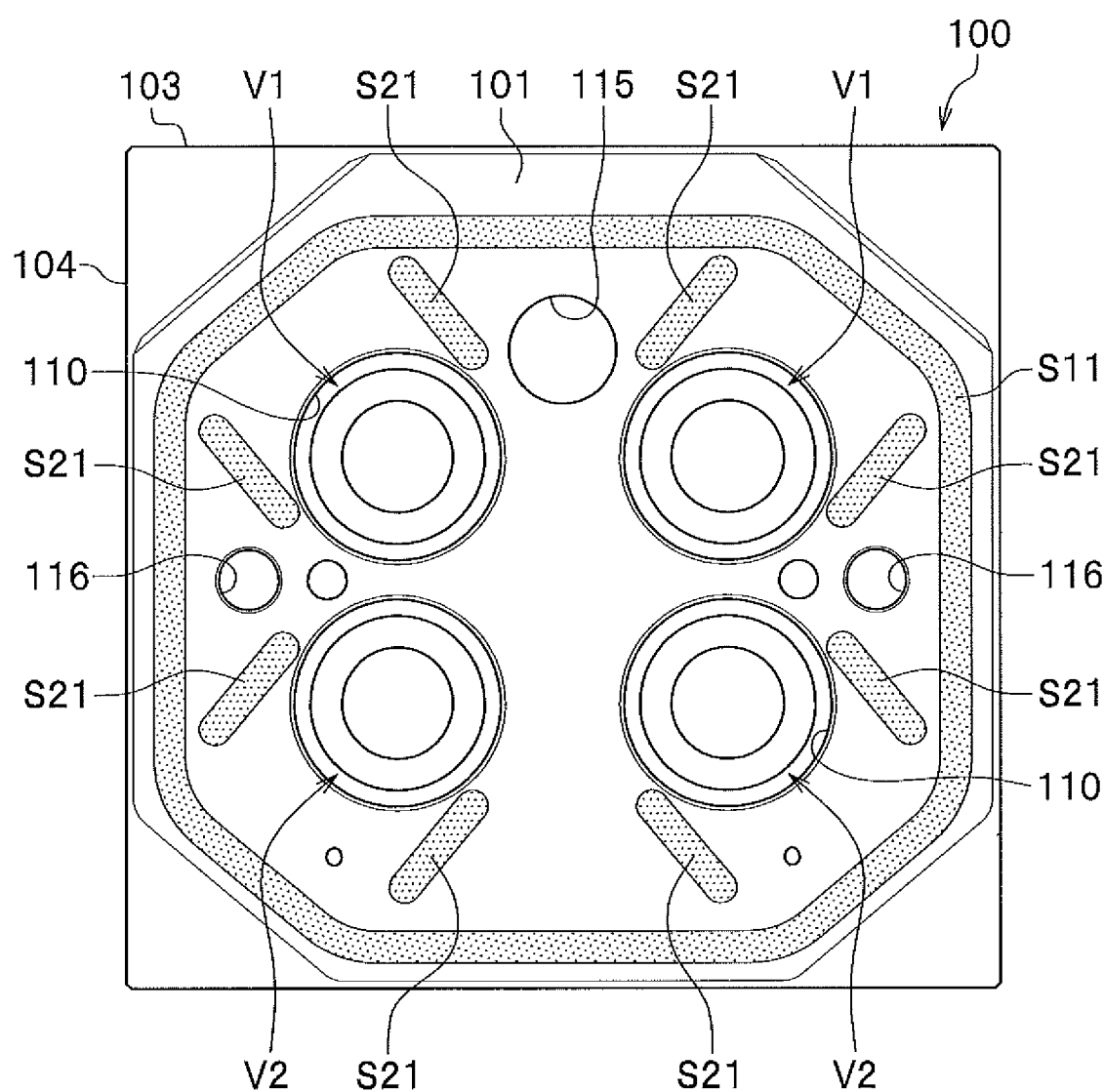
FIG. 10 is a front view of a base body applied to the vehicular brake fluid pressure control device of the first embodiment to show an adhesion area.

The second peripheral wall 212 is formed at the rear end thereof with a peripheral groove 228. An adhesive to fix the housing 202 to the front surface 101 of the base body 100 is interposed in the peripheral groove 228. The housing 202 is liquid-tightly sealed to the front surface 101 of the base body 100 via an adhesive. The peripheral groove 228 and the rib 25 contact an annular region indicated by a hatching line S11 (see FIG. 10) and linear regions indicated by hatching-lines S21 (see FIG. 10), on both sides of the solenoid valves V1 or V2 at positions corresponding to the ribs 25, on the front surface 101 of the base body 100 in FIG. 2, in a state of the adhesive being interposed. Note that the adhesive is applied to the annular hatching line S11 and the linear hatching lines S21 in the same step. The housing 202 is attached to the base body 100, with fixing screws (not shown), which have been inserted into the bosses 221 of the holding wall 220 of the second housing chamber 216, being screwed into screw holes 116 (see FIGS. 2, 10) of the base body 100.

The lid 203 is a lid made of resin to seal an opening of the front surface of the housing 202, on an opposite side from the base body 100. The lid 203 is fixed to the front end surface of the housing 202 by means such as welding, adhesion, or screw fastening.

<Configuration of Coil Assembly>

Figure 5A:
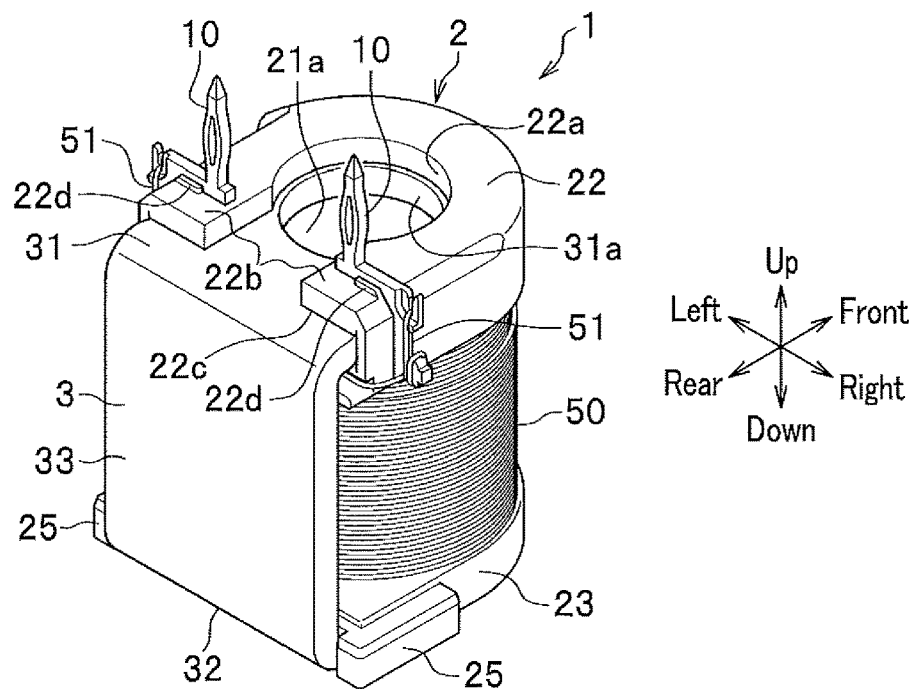
FIGS. 5A and 5B show a coil assembly of the first embodiment, where

The coil assembly 1 includes a bobbin 2, a coil 50, a yoke 3, and the press-fit terminal 10 as a connection terminal, as shown in FIGS. 5A and 6. The coil assembly 1 is an electrical component to be housed in the housing 202 in a state of surrounding the solenoid valve V1 or V2 as shown in FIG. 1. The coil assembly 1 is a solenoid coil that has the coil 50 energized by the control board 201 through the press-fit terminal 10 to generate a magnetic field around the electromagnetic valve V1 or V2. The coil assembly 1 is fixed to the front surface 101 of the base body 100 via an adhesive as described later.

<Configuration of Bobbin>

The bobbin 2 is a resin component (insulation component) to have guards 22, 23 formed at the upper and lower ends of a cylindrical portion 21, as shown in FIG. 6D. The cylindrical portion 21 has an insertion hole 21a in a circular shape, as a bobbin insertion hole, penetrating in the center. The insertion hole 21a communicates with an upper yoke housing 22c defined in the upper guard 22 and a hole 22a of the guard 22. In addition, the insertion hole 21a communicates with a lower yoke housing 23a defined in the lower guard 23. The insertion hole 21a has an inner diameter D1. As shown in FIGS. 6A, 6E, the guards 22, 23 each have a front portion thereof formed in a semicircular shape, in planar view, so as to correspond to the shape of the wound coil 50, and a rear portion thereof formed in a substantially rectangular shape, in planar view, so as to correspond to the shape of the yoke. Note that the inner diameter of the hole 22a of the guard 22 is larger than the inner diameter D1 of the insertion hole 21a.

The upper guard 22 is formed thicker in the up-down direction than the lower guard 23, as shown in FIG. 6D. The upper guard 22 is formed inside thereof with the upper yoke housing 22c to allow an upper portion 31 of the yoke 3 to be housed. The upper yoke housing 22c is open in the rear and front surfaces of the upper guard 22. The upper portion 31 of the yoke 3 is housed into the upper yoke housing 22c from behind the upper guard 22.

The upper yoke housing 22c has a predetermined clearance from the upper portion 31 of the housed yoke 3 in a direction orthogonal to the axial direction of the bobbin 2 (horizontal direction). This allows the upper portion 31 of the yoke 3 to be horizontally moved in the upper yoke housing 22c up to the clearance. Note that the guard 22 covers the upper portion 31 of the yoke 3 substantially as a whole, to have excellent insulation properties.

The upper guard 22 is formed at the rear edge thereof with two protrusions 22e (only one side is shown) at a predetermined interval in the right-left direction, as shown in FIG. 6C. The projection 22e is a plate-like portion that protrudes rearward from the rear edge of the upper guard 22 and is rectangular in planar view.

Figure 5B:
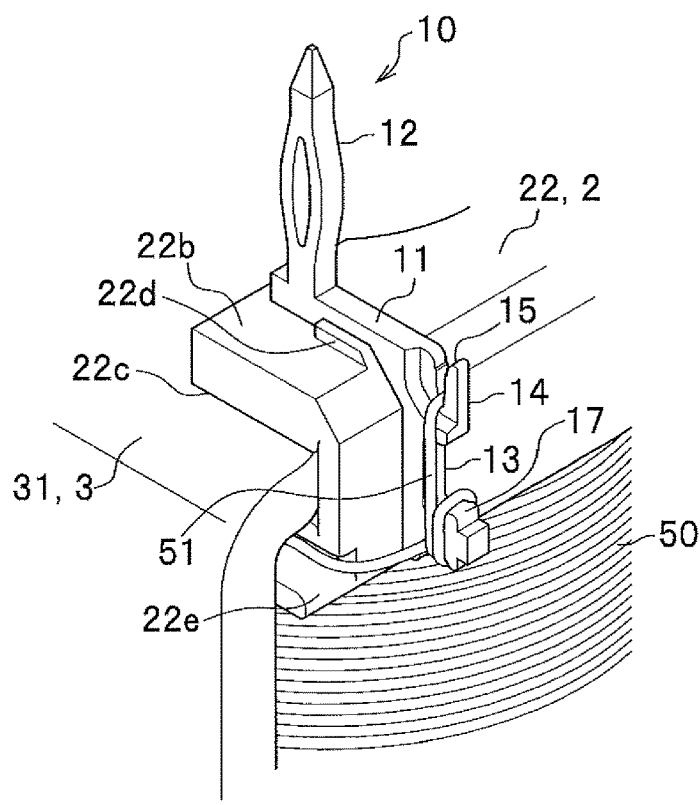

In addition, the upper guard 22 is formed on the right and left rear portions thereof with terminal support portions 22b to support base portions 11 of the two press-fit terminals 10, as shown in FIGS. 5A and 5B. The press-fit terminal 10 is partially buried in the terminal support portion 22b by insert molding. That is, the terminal support portion 22b (the upper guard 22) works as an insulator for the press-fit terminal 10. The upper portion 31 of the yoke 3 housed in the upper yoke housing 22c is disposed under the terminal support portion 22b. That is, the two press-fit terminals 10 are supported by the upper portion 31 of the yoke 3 via the terminal support portions 22b. Here, the terminal support portions 22b cover portions of the upper portion 31 of the yoke 3, which support the press-fit terminals 10. This makes the press-fit terminals 10 insulated from the yoke 3.

The lower guard 23 defines, inside thereof, lower yoke housing 23a to house a lower portion 32 of the yoke 3, as shown in FIG. 6D. The lower yoke housing 23a is open on the rear surface and lower surface of the lower guard 23. That is, the lower portion 32 of the yoke 3 is exposed to the lower surface of the coil assembly 1 (see FIG. 6E). The lower portion 32 of the yoke 3 is housed in the lower yoke housing 23a from behind the lower guard 23.

Curved convex portions 23b protruding inward are formed on an inner surface of the lower yoke housing 23a at the right and left portions of the inner surface to face each other, as shown in FIG. 6E. The lower yoke housing 23a has a predetermined clearance in the direction orthogonal to the axial direction of the bobbin 2 (horizontal direction) from the lower portion 32 of the housed yoke 3, as with the upper yoke housing 22c. This allows the lower portion 32 of the yoke 3 to be horizontally moved in the lower yoke housing 23a up to the clearance.

The lower guard 23 is formed on the right and left rear side surfaces thereof (the outer surface of the coil assembly 1 perpendicular to the direction of being assembled) with ribs 25 in a square-prism shape. The ribs 25 work as fitting portions (positioning portions) when the coil assembly 1 is assembled into the second housing chamber 216 of the housing 202 (see FIG. 3). Specifically, the ribs 25 are press-fitted into the grooves 226 provided in the mounting space 225 of the second housing chamber 216, as shown in FIGS. 2 and 3. This press-fitting restricts the coil assembly 1 from being moved in a direction orthogonal to the direction of being assembled to the housing 202 (the arrow direction in FIG. 8A, or the axial direction of the coil assembly 1), and from being rotated about the axis in parallel to the direction of being assembled.

Figure 8B:
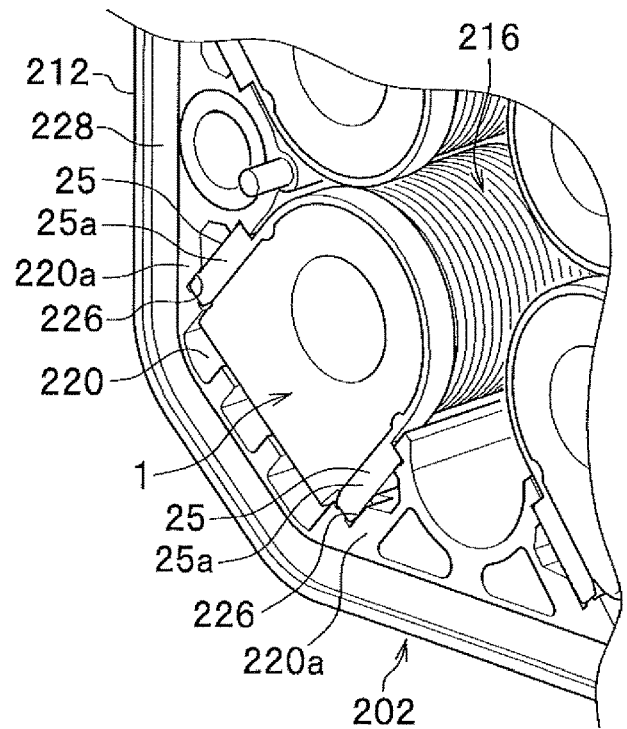
Figure 9:
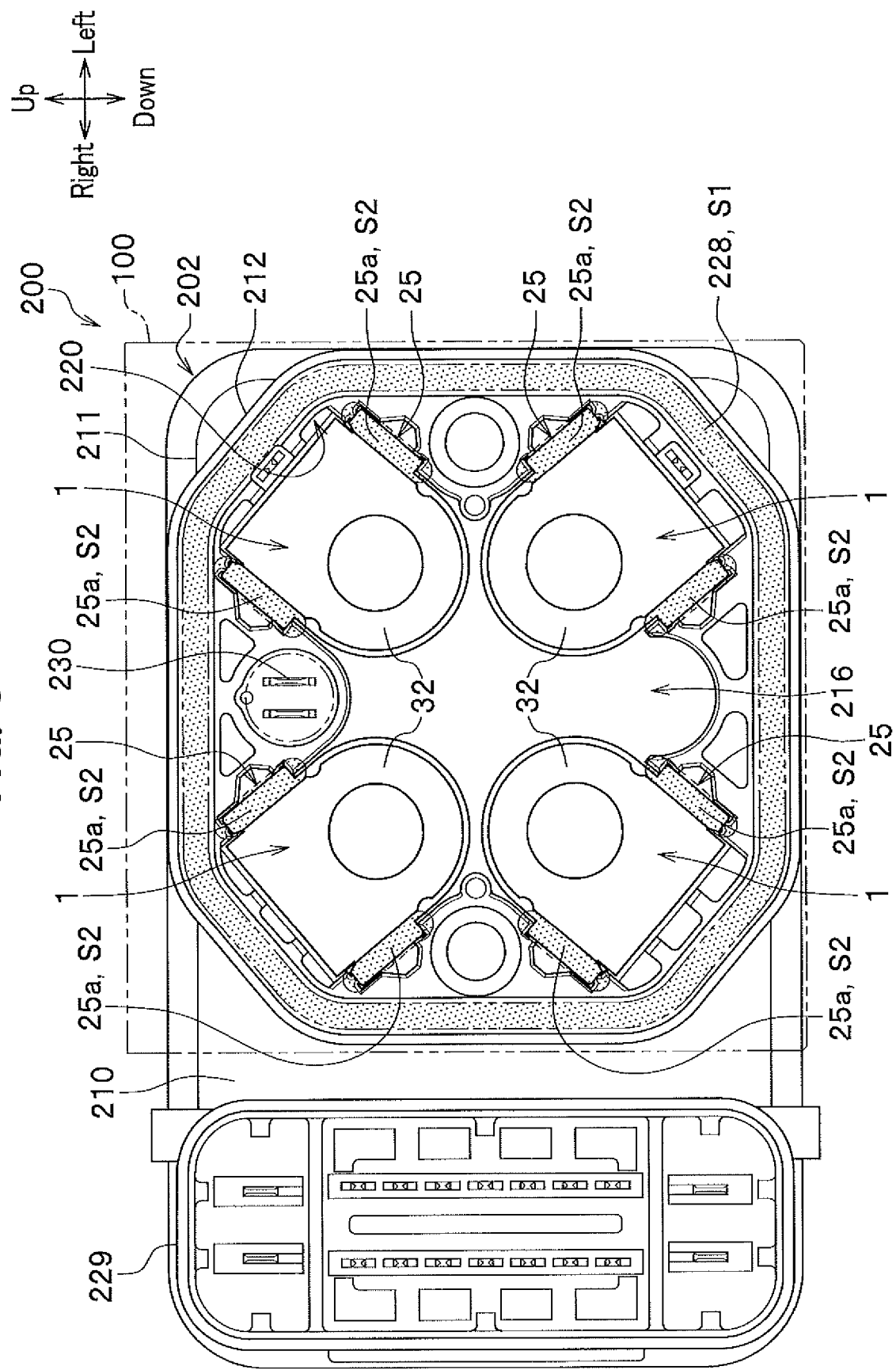
FIG. 9 is a rear view of the electrical component assembly of the first embodiment to show a housing adhesion margin and an electrical component adhesion margin.

Additionally, the rib 25 also works as an electrical component adhesion margin S2 (see FIG. 9) for fixing the coil assembly 1 to the front surface 101 of the base body 100 with an adhesive. Specifically, a lower surface 25a of the rib 25 is disposed flush with a rear surface 220a of the holding wall 220, in a state of the rib 25 being press-fitted into the groove 226, as shown in FIG. 8B. This allows the lower surface 25a of the rib 25 to contact the front face 101 of the base body 100, and to work as the electrical component adhesion margin S2 for fixing the coil assembly 1 with an adhesive. Note that the housing 202 may be provided inside thereof with intermediate wall portions (not shown) to define grooves, for example, and the ribs 25 may be press-fitted into the grooves. Here, the adhesive is not limited to one interposed only on the lower surface 25a of the rib 25, and may extend from the rib 25 onto the lower surface of the lower portion 32 of the yoke 3. Alternatively, the adhesive may be partially interposed on the lower surface 25a of the rib 25. In any case, an adhesive may be interposed so that the coil assembly 1 is fixed to the front surface 101 of the base body 100 by the adhesive.

The bobbin 2 as described above is produced by injection molding or the like, for example. At the same time as the bobbin 2 is injection-molded, the press-fit terminals 10 are insert-molded so as to be integrally joined to the guard 22.

<Configuration of Yoke>

The yoke 3 is a member attached to the bobbin 2 and is formed of a magnetic metal material. As shown in FIGS. 5A, 6D, the yoke 3 is composed of the upper portion 31, the lower portion 32, and a side portion 33 to connect the upper portion 31 and the lower portion 32. The yoke 3 is formed in a substantially concave shape in a longitudinal cross section (see FIG. 6D). The upper portion 31 is a portion housed in the upper yoke housing 22c of the guard 22 on the upper side of the bobbin 2. The upper portion 31 has the same outer shape as the guard 22 on the upper side of the bobbin 2 to have a front portion formed in a semicircular shape and a rear portion formed in a substantially rectangular shape. The upper portion 31 is formed so as to be housed in the upper yoke housing 22c with the above-described clearance, and is horizontally movable in the upper yoke housing 22c. Note that the upper portion 31 is formed to be slightly smaller in external size than the lower portion 32, to make the upper portion easily distinguished from the lower portion at the time of assembling.

The upper portion 31 is housed in the upper yoke housing 22c so as to be disposed under the press-fit terminals 10 via the upper guard 22. That is, the upper portion 31 supports the press-fit terminals 10 (each including a terminal portion 12 and the base portion 11) on axially extended lines from the terminal portions 12. The lower portion 32 is a portion housed in the lower yoke housing 23a of the guard 23 on the lower side of the bobbin 2 (see FIG. 6D). The lower portion 32 has a front portion formed in a semicircular shape and a rear portion formed in a substantially rectangular shape, as with the external shape of the upper portion 31. The lower portion 32 is formed with concave portions 32b at positions facing the convex portions 23b of the lower yoke housing 23a, as shown in FIG. 6E. In a state of the lower portion 32 being housed in the lower yoke housing 23a, the convex portions 23b of the lower yoke housing 23a are loosely fitted (fitted with a gap) in the concave portions 32b of the lower portion 32. The lower portion 32 is housed in the lower yoke housing 23a with a clearance, so as to be horizontally moved in the lower yoke housing 23a in the state of the convex portions 23b being loosely fitted to the concave portions 32b as described above. In other words, the convex portion 23b is fitted in the concave portion 32b so as to allow the above-described horizontal movement.

As shown in FIG. 6D, the yoke 3 is formed with a circular insertion hole 31a in the upper portion 31 and a circular mounting hole 32a in the lower portion 32, as yoke-side insertion holes. The insertion holes 31a, 32a have the same inner diameter D2. The inner diameter D2 is set to a size to be externally fitted to the solenoid valve V1 (or V2). Here, the inner diameter D1 of the insertion hole 21a in the bobbin 2 and the inner diameter D2 of the insertion holes 31a, 32a in the yoke 3 are set to have a relationship of "(the inner diameter D1)>(the inner diameter D2)" so that the inner diameter D1 of the bobbin 2 is larger than the inner diameter D2 of the yoke 3.

<Configuration of Press-fit Terminal>

A pair of the press-fit terminals 10 are metal parts partially insert-molded on the terminal support portions 22b (of the bobbin 2), as shown in FIG. 5B. A pair of the press-fit terminals 10 are disposed at a predetermined distance in the right-left direction with each other, as shown in FIG. 5A. A pair of the press-fit terminals 10 have respective ends of winding 51 electrically connected thereto.

The press-fit terminal 10 includes the plate-like base portion 11, the terminal portion 12 protruding upward from an upper portion at one end of the base portion 11, and a connecting portion 13 protruding downward from a lower portion at the other end of the base portion 11, as shown in FIGS. 7A to 7D. Most of the base portion 11 is buried in the terminal support 22b, as shown in FIG. 5B. The upper portion of the base portion 11 is exposed from the terminal support 22b. The base portion 11 is formed with an insertion hole 11a to allow resin to enter thereinto at the time of molding, as shown in FIG. 7A. The base portion 11 is reinforced and supported by a reinforcing rib 22d provided on the terminal support 22b, as shown in FIG. 5B.

The terminal portion 12 vertically protrudes upward (outward in the axial direction of the bobbin 2) from the top at one end of the base portion 11. That is, the terminal portion 12 extends upward above the upper guard 22. The front end of the terminal portion 12 bulges in an annular shape, and is press-contacted into the throughhole 201a (see FIG. 1) of the control board 201 (see FIG. 1).

The connection portion 13 is a portion to which the winding 51 of the coil 50 is connected. In the connection portion 13, the contact portion 14 contacting with the winding 51 has a plate thickness thinner than that of the rest of the connection portion 13. That is, the connecting portion 13, to be connected with the winding 51, of the press-fit terminal 10, to be subject to restriction in thickness due to pressure contact, is made thin so that the coating of the winding 51 is scraped off by contact. The contact portion 14 is formed with a groove 15 having a substantially V-shaped cross section, as shown in FIG. 7D. The upper edge of the groove 15 extends in a rounded shape. A pair of step portions 16 projecting toward the inside (inner side) of the groove 15 is formed at portions of the inner surfaces of the groove 15, facing each other. A groove 15b at the step portions 16 is formed to have a narrow width. A width L1 (the width in the right-left direction) of the groove 15b, at the step portions 16 of the groove 15, is smaller than a wire diameter D3 of the winding 51 (diameter of the wire having a coat or coats). The groove 15 is formed to have a narrower width toward a deepest portion 15c.

The connection portion 13 is formed at a lower lateral thereof with a projection 17 to have the winding 51 wounded between itself and the groove 15, as shown in FIGS. 7A, 7C. Additionally, the connection portion 13 is formed at the lower end thereof with a hook-like portion 13*b* protruding in a hook shape toward the terminal support portion 22*b* (see FIG. 5B). The hook-like portion 13*b* is buried, even though not shown, in the terminal support 22*b* (see FIG. 5B).

The press-fit terminal 10 is obtained through a pressing (press punching) process, for example. The thin contact portion 14 is formed to be thin through a press-punching process followed by a press process. Then, the groove 15 is punched out. Note that the contact portion 14 may be formed through a press-punching process and a pressing process being executed at the same time, or through a pressing process to form the contact portion 14 followed by a punching process.

<Configuration of Coil>

The coil 50 is formed to have the winding 51 wound around the cylindrical portion 21 of the bobbin 2, as shown in FIG. 5A. The windings 51 at both ends are wound around the connection portions 13 of the press-fit terminals 10, and the coil 50 is electrically connected with the press-fit terminals 10.

<Assemblying Coil Assembly to Housing)

The coil assembly 1 is assembled to the housing 202 from behind the second housing chamber 216, as shown in FIG. 8A. In this case, the coil assembly 1 is inserted into the mounting space 225, with the press-fit terminal 10 oriented to the mounting space 225 and the side portion 33 of the yoke 3 oriented to the reinforcing rib 227 of the mounting space 225. Note that the shape of the press-fit terminal 10 is simplified in FIG. 8A.

When the coil assembly 1 is inserted in the direction of assembly, as shown by arrows in FIG. 8A, the ribs 25 of the guard 23 of the bobbin 2 contact opening edges of the grooves 226 in the mounting space 225. The coil assembly 1 is pushed in the direction of assembly in this state, to insert the ribs 25 into the grooves 226 for press-fitting.

This press-fitting causes the coil assembly 1 to be positioned and fixed at a predetermined location in the second housing chamber 216 of the housing 202.

<Assembling Housing to Base Body>

Once the coil assemblies 1 are assembled to the housing 202, an adhesive is applied to the annular hatching line S11 and the linear hatching lines S21 on the front surface 101 of the base body 100, which respectively correspond to the housing adhesion margin S1 in the peripheral groove 228 of the housing 202 and the electrical component adhesion margins S2 on the lower surfaces 25*a* of the ribs 25 of the coil assemblies 1. Then, the housing 202 is moved closer to the front surface 101 of the base body 100 to mount the coil assemblies 1 onto the solenoid valves V1, V2 protruding from the front surface 101 until the rear end of the housing 202 contacts the front surface 101 of the base body 100. This causes the housing 202 and the coil assemblies 1 to be adhered to the front surface 101 of the base body 100 with the adhesive interposed between the base body 100 and the housing adhesion margin S1 as well as the electrical component adhesion margins S2. Then, fixing screws (not shown), which have been inserted into the bosses 221 of the holding wall 220 of the second housing chamber 216, are screwed into the screw holes 116 (see FIG. 2) in the base body 100. This causes the housing 202 and the coil assemblies 1 to be fixed to the front surface 101 of the base body 100.

Note that the inner diameter D1 of the insertion hole 21*a* in the bobbin 2 is larger than the inner diameter D2 of the insertion holes 31*a*, 32*a* in the yoke 3. This allows the yoke 3 to be moved (in the direction orthogonal to the axial direction) with respect to the bobbin 2 fixed to the housing 202, when the coil assemblies 1 are mounted onto the solenoid valves V1, V2. Accordingly, even if there are one or more slight positional deviations relatively between the solenoid valves V1, V2 and the coil assemblies 1, the one or more positional deviations are absorbed to allow the coil assemblies 1 to be mounted onto the solenoid valves V1, V2. That is, the coil assemblies 1 are mounted, with the positional deviation(s) from the solenoid valves V1, V2 absorbed while the press-fit terminals 10 are positioned at predetermined locations.

<Assembling Control Board to Housing>

After the housing 202 is assembled to the base body 100, the control board 201 is assembled through the opening of the first housing chamber 215 opened on the front side of the housing 202. At the time of assembly, the throughholes 201*a* of the control board 201 are aligned with the front ends of the corresponding press-fit terminals 10, and the control board 201 is pushed toward the coil assemblies 1. Then, the terminal portions 12 of the press-fit terminals 10 are pressed into the throughholes 201*a*. Note that during this time, the press-fit terminal 10 is held by the terminal support portion 22*b* of the coil assembly 1 to maintain an upright posture on the terminal support portion 22*b*. This causes the terminal portion 12 of the press-fit terminal 10 to be reliably pressed into the throughhole 201*a*. Then, the lid 203 is liquid-tightly fixed to the front end of the first housing chamber 215 by an adhesive or the like.

In the foregoing embodiment, the coil assemblies 1 are directly fixed to the base body 100 at the predetermined locations with an adhesive interposed between the base body 100 and the electrical component adhesion margins S2 of the coil assemblies 1. Therefore, the press-fit terminal 10 is accurately disposed at the predetermined location, to allow the press-fit terminal 10 to be easily connected to the control board 201. As a result, the coil assembly 1 is suitably prevented from coming off, while a simple structure of connection by the press fit terminal 10 to the control board 201 is adopted.

In addition, the housing 202 is directly fixed to the base body 100 at the predetermined location with an adhesive interposed between the base body 100 and the housing adhesion margin S1 of the housing 202. Therefore, in combination with the coil assembly 1 being directly fixed to the base body 100 with an adhesive, the press fit terminal 10 is more accurately disposed at the predetermined location, to allow the press fit terminal 10 to be easily connected to the control board 201. As a result, the coil assembly 1 is suitably prevented from coming off, while a simple structure of connection by the press fit terminal 10 to the control board 201 is adopted. Besides, an adhesive is applied to the housing adhesion margin S1 and the adhesion area of the base body 100 (hatching line S11), endlessly and seamlessly, to seal a gap between the base body 100 and the housing 202 without using any rubber-like sealing member.

Further, the coil assembly 1 is positioned and fixed to the housing 202 by press-fitting the ribs 25 into the grooves 226 of the housing 202. This allows the press-fit terminals 10 to be accurately disposed at the predetermined locations of the housing 202, making the press-fit terminals 10 easily positioned. Accordingly, the press-fit terminals 10 are easily connected to the control board 201.

Furthermore, the electrical component adhesion margin S2 is formed on the bottom surface 25a of the rib 25, to allow the coil assembly 1 to be fixed to the base body 100 without any separate electrical component adhesion margin. This allows the coil assembly 1 to be reduced in size.

Moreover, the press-fit terminal 10 is used as a connection terminal to allow the press-fit terminal 10 to be electrically connected with the control board 201 easily, to improve assembling efficiency.

The vehicular brake fluid pressure control device U of the present embodiment allows the coil assembly 1 to be fixed at the predetermined location of the housing 202, and allows the press-fit terminal 10 to be accurately disposed at the predetermined location. Then, assembling efficiency is improved to reduce costs.

Second Embodiment

Next, a description will be given of a vehicular brake fluid pressure control device to which the electrical component assembly of a second embodiment is applied. In the present embodiment, a description will be given of a case where the electrical component assembly is applied to a vehicular brake fluid pressure control device for a two-wheeled vehicle provided with one brake system, as an example. Of course, the present invention may be applied to a vehicular brake fluid pressure control device provided with two brake systems for a two-wheeled vehicle or a four-wheeled vehicle. Note that the same components as those in the first embodiment will be indicated by the same reference numerals and detailed descriptions thereof will be omitted.

Figure 11:
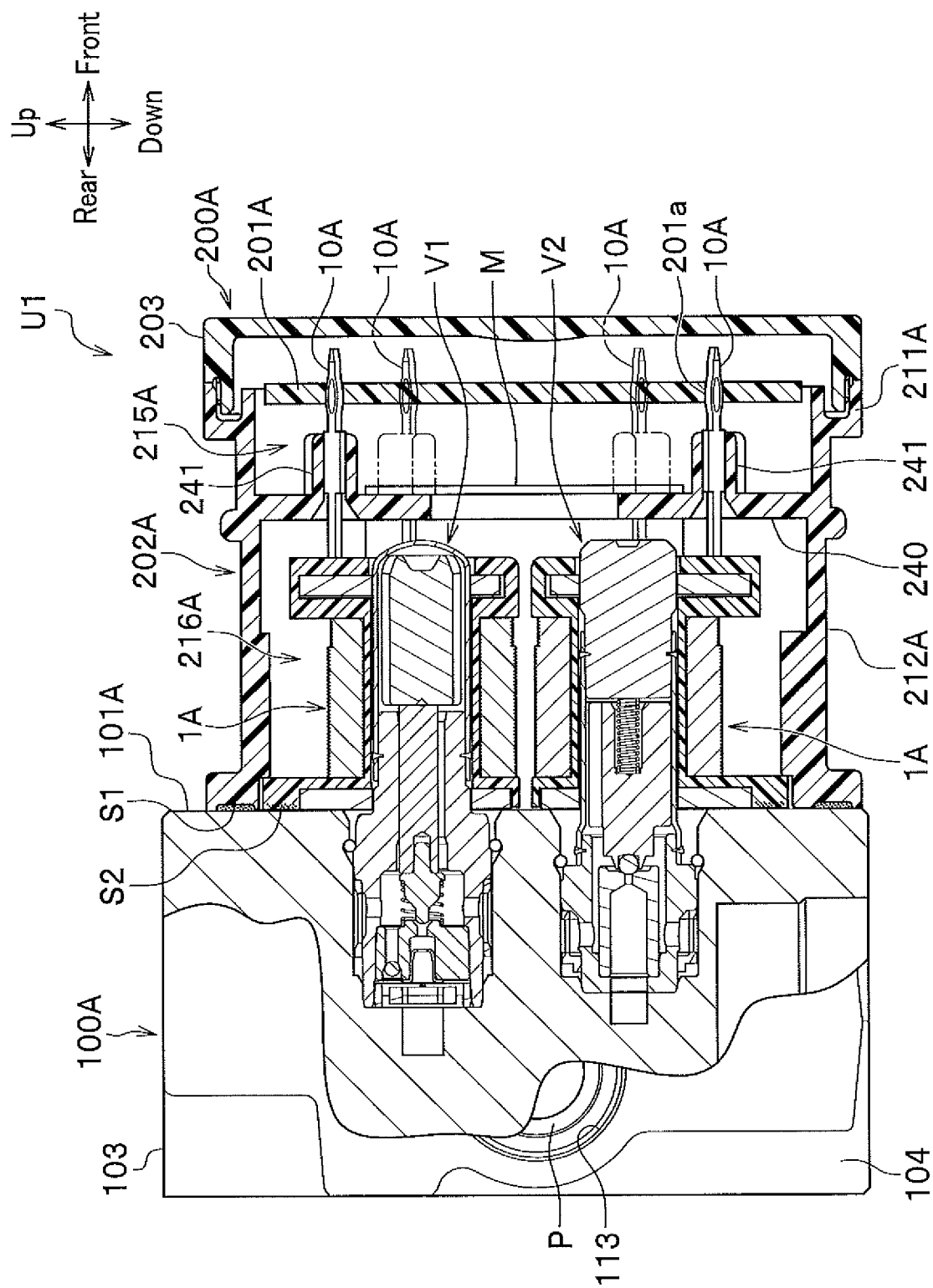
FIG. 11 is a side sectional view of a vehicular brake fluid pressure control device provided with an electrical component assembly of a second embodiment of the present invention.
Figure 12:
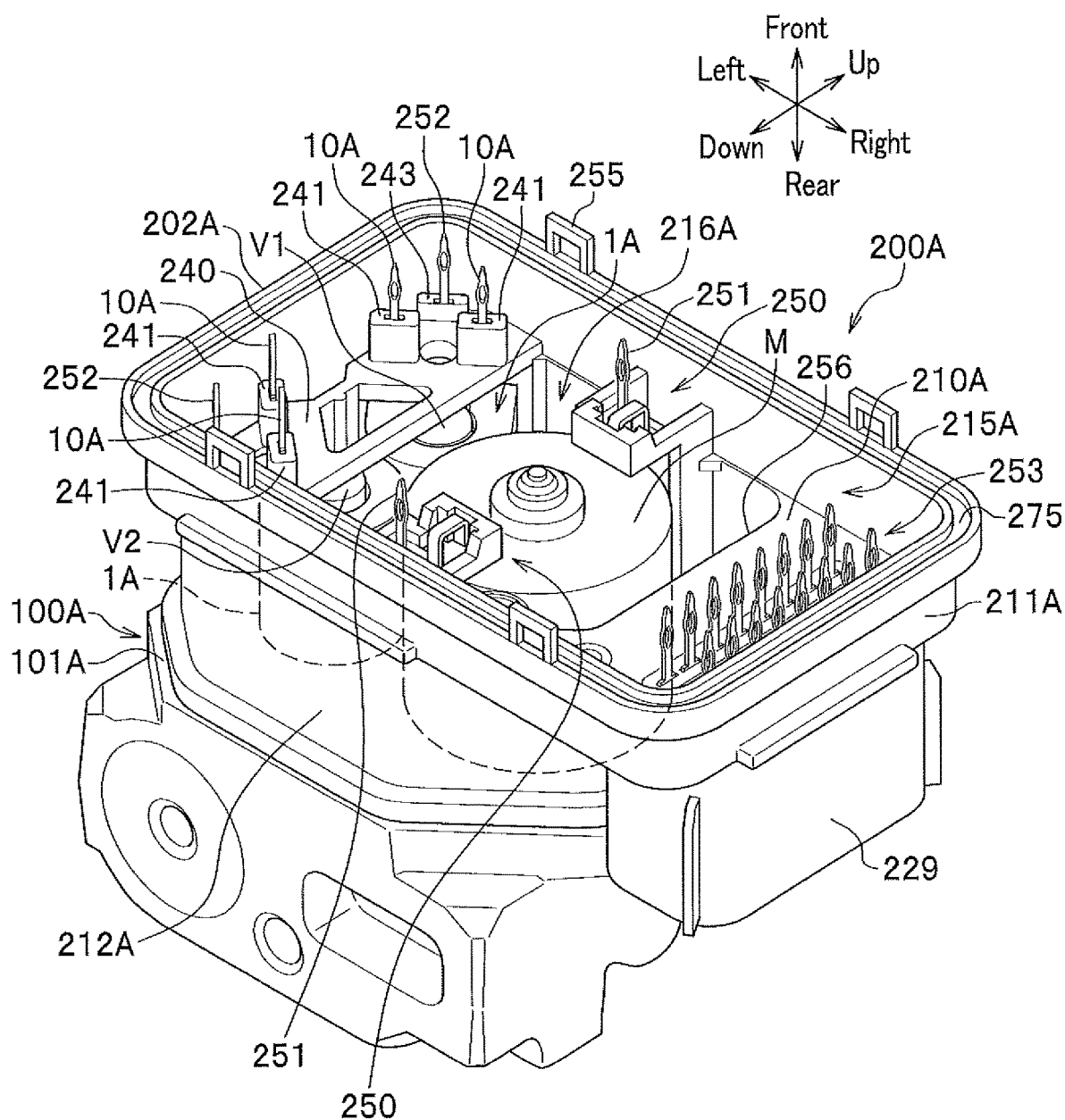
FIG. 12 is a perspective view of the vehicular brake fluid pressure control device to show a layout in the housing.

A vehicular brake fluid pressure control device U1 of the present embodiment has a structure in which the solenoid valves V1, V2 and the motor M are housed in a housing 202A of an electronic control unit 200A as an electrical component assembly, as shown in FIGS. 11, 12.

The vehicular brake fluid pressure control device U1 includes a base body 100A in which the solenoid valves V1, V2 for one brake system, the motor M, and the reciprocating pump P are assembled.

<Structure of Base Body>

Figure 13:
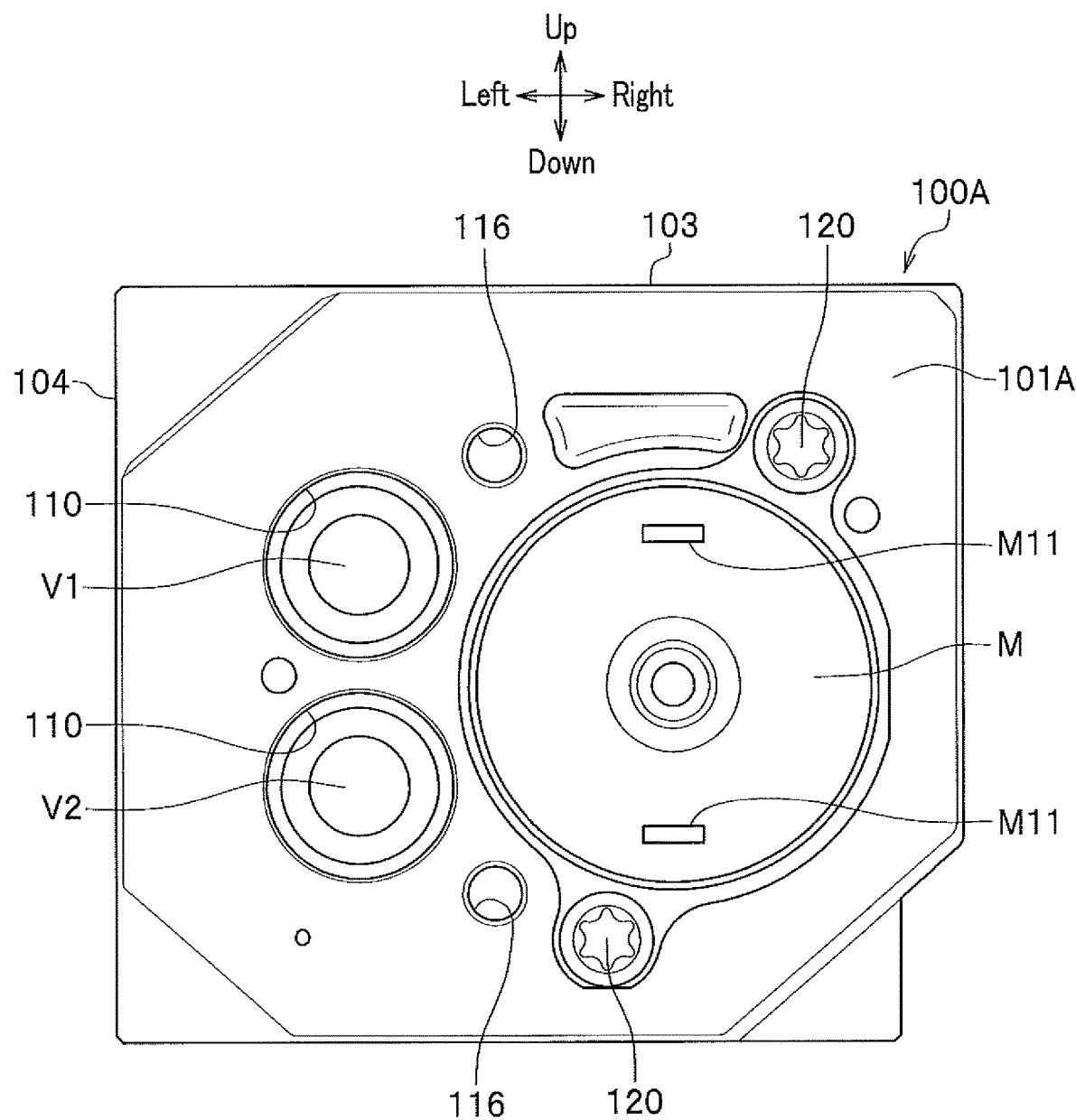
FIG. 13 is a front view of a base body applied to the vehicular brake fluid pressure control device (to show a surface to which the electrical component assembly is attached)
Figure 14:
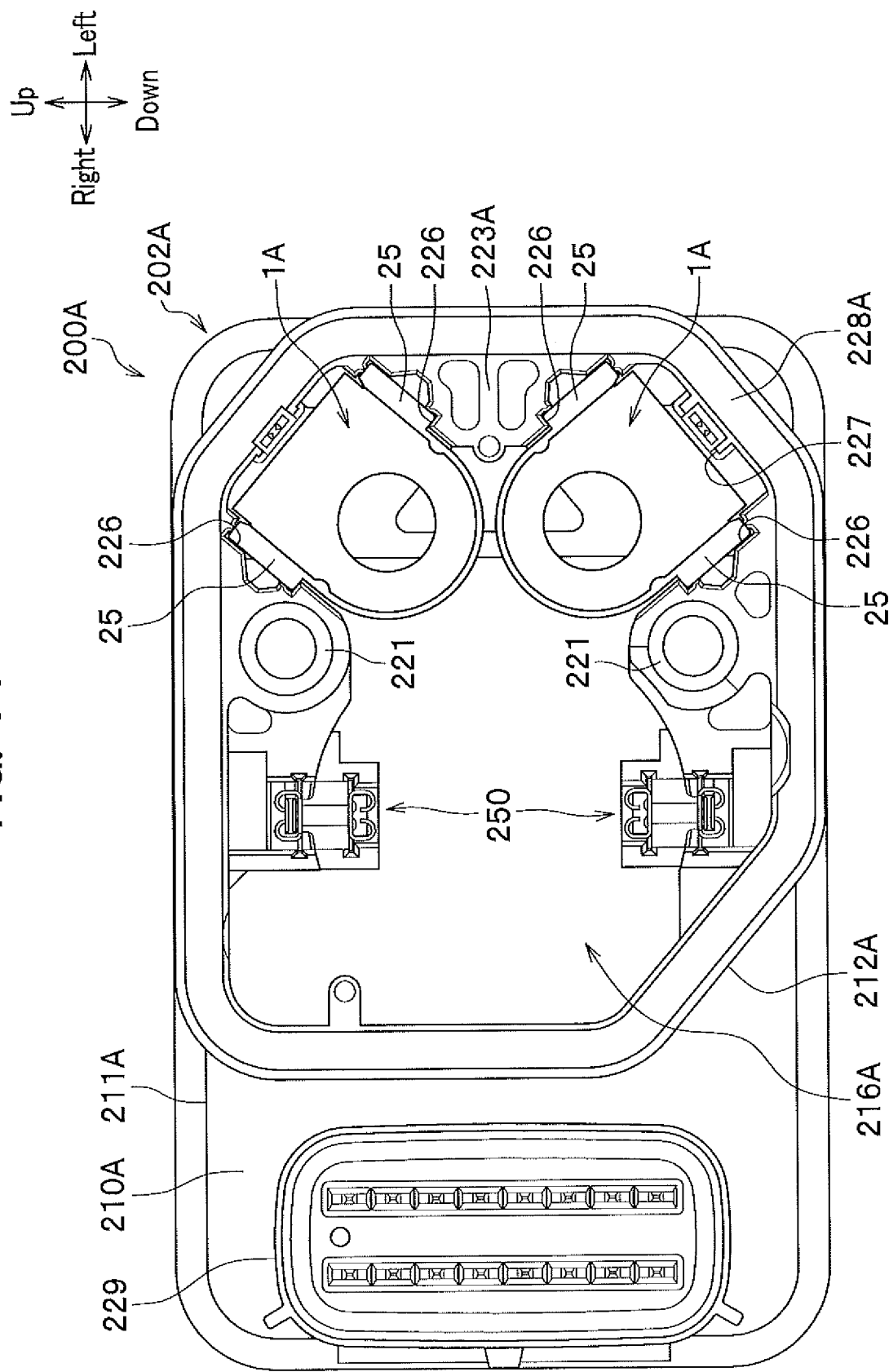
FIG. 14 is a rear view of the electrical component assembly of the second embodiment.

The base body 100A is a metal part formed in a substantially rectangular parallelepiped (see FIGS. 12, 13), and is formed therein with a brake fluid passage (oil passage) which is not shown. A front surface 101A as one surface of the base body 100A is formed therein with a plurality of holes such as the bottomed mounting holes 110 in which the solenoid valves V1, V2 are mounted, and a bottomed mounting hole (not shown) in which the motor M is mounted, as shown in FIG. 13. That is, the front surface 101A of the base body 100A are collectively formed therein with mounting holes for the solenoid valves V1, V2 and the motor M. The solenoid valves V1, V2 each have the coil assembly 1, as an electrical component, mounted thereon. Each coil assembly 1 is electrically connected to a control board 201A (see FIG. 11, the same shall apply hereinafter) using press-fit terminals 10A, as described later.

<Configuration of Motor>

Figure 21:
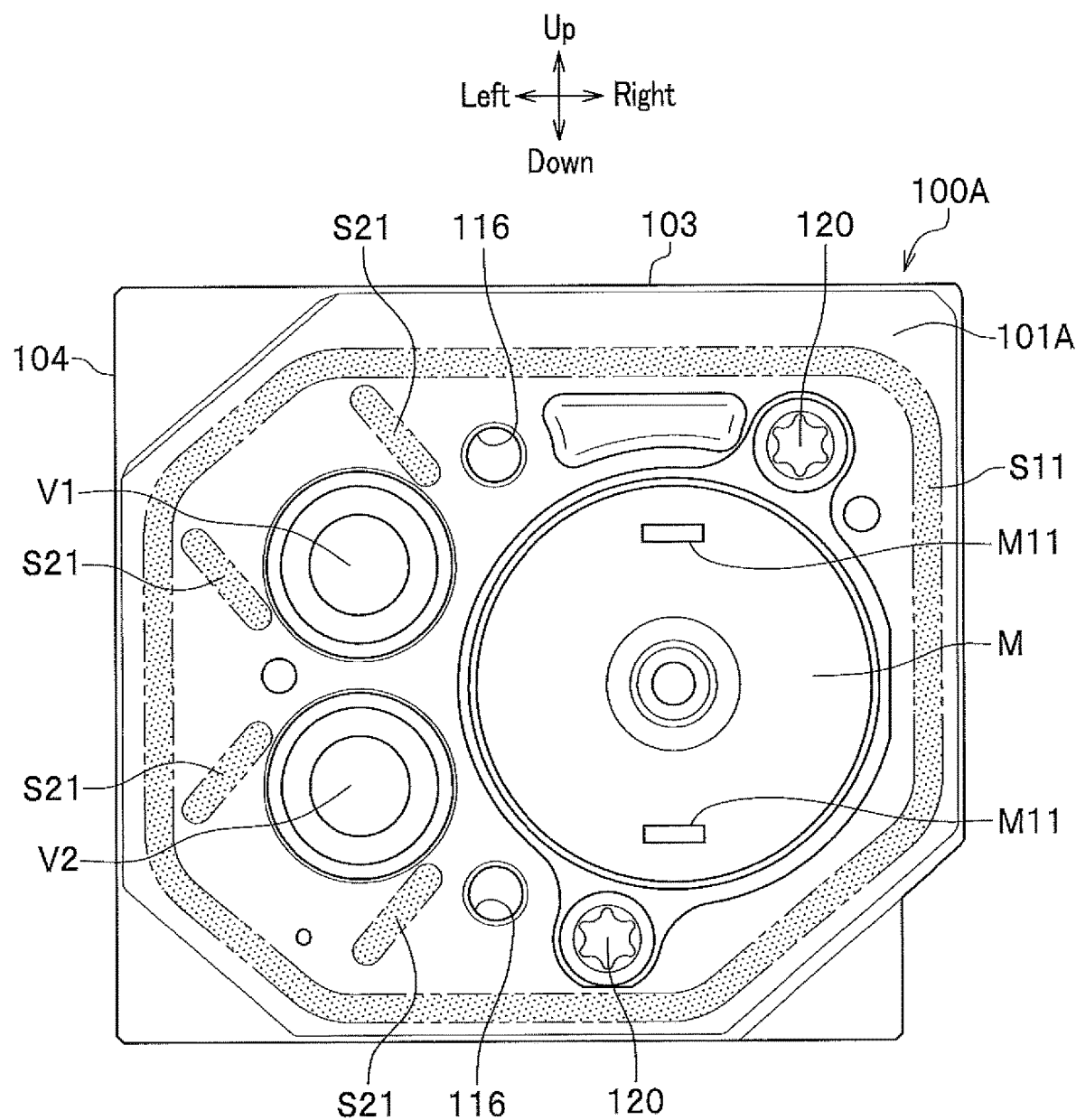
FIG. 21 is a front view of a base body applied to the vehicular brake fluid pressure control device of the second embodiment to show an adhesion area.

The motor M is integrally fixed to the front surface 101A of the base body 100A with bolts 120 (see FIG. 21). A pair of motor bus bars M11 (see FIGS. 13, 21) is provided on the bottom of the cover of the motor M, to be respectively connected to bus bar terminals 250 provided on an inner wall (of a first housing chamber 215A) of the housing 202A, as shown in FIG. 12. The bus bar terminal 250A is provided thereon, vertically, with a press-fit terminal 251 for connection to the control board 201A.

<Configuration of Electronic Control Unit>

The electronic control unit 200A includes a coil assembly 1A, the control board 201A, the housing 202A, and the lid 203. The coil assembly 1A is fixed to the housing 202A by press-fitting, as in the first embodiment. The housing 202A houses the coil assembly 1A and the control board 201A, and also houses the solenoid valves V1, V2 and the motor M, which protrude from the base body 100A.

The control board 201A regulates the coil assembly 1A and the motor M being energized, to control opening/closing the solenoid valves V1, V2 and driving the motor M.

<Configuration of Housing>

The housing 202A is a box integrally fixed to the front surface 101A of the base body 100A in a state of covering the solenoid valves V1, V2 and the motor M protruding from the front surface 101A of the base body 100A, as shown in FIG. 11. The housing 202A is integrally formed of a resin material, as in the first embodiment. The housing 202A has the control board 201A and the coil assembly 1A assembled thereto. A front surface, on an opposite side from the base body 100A, and a rear surface, facing the base body 100A, of the housing 202A are open.

The housing 202A includes a plate-like bottom 210A, a first peripheral wall 211A provided on the front side of the bottom 210A, and a second peripheral wall 212A provided on the rear side of the bottom 210A, as shown in FIG. 12. The bottom 210A has a substantially rectangular outer shape. The first peripheral wall 211A extends forward from the peripheral edge of the bottom 210A, to have an outer periphery in a substantially rectangular shape. The first peripheral wall 211A defines a first housing chamber 215A (see FIG. 11) to house therein the control board 201A in a substantially rectangular shape.

Figure 15:
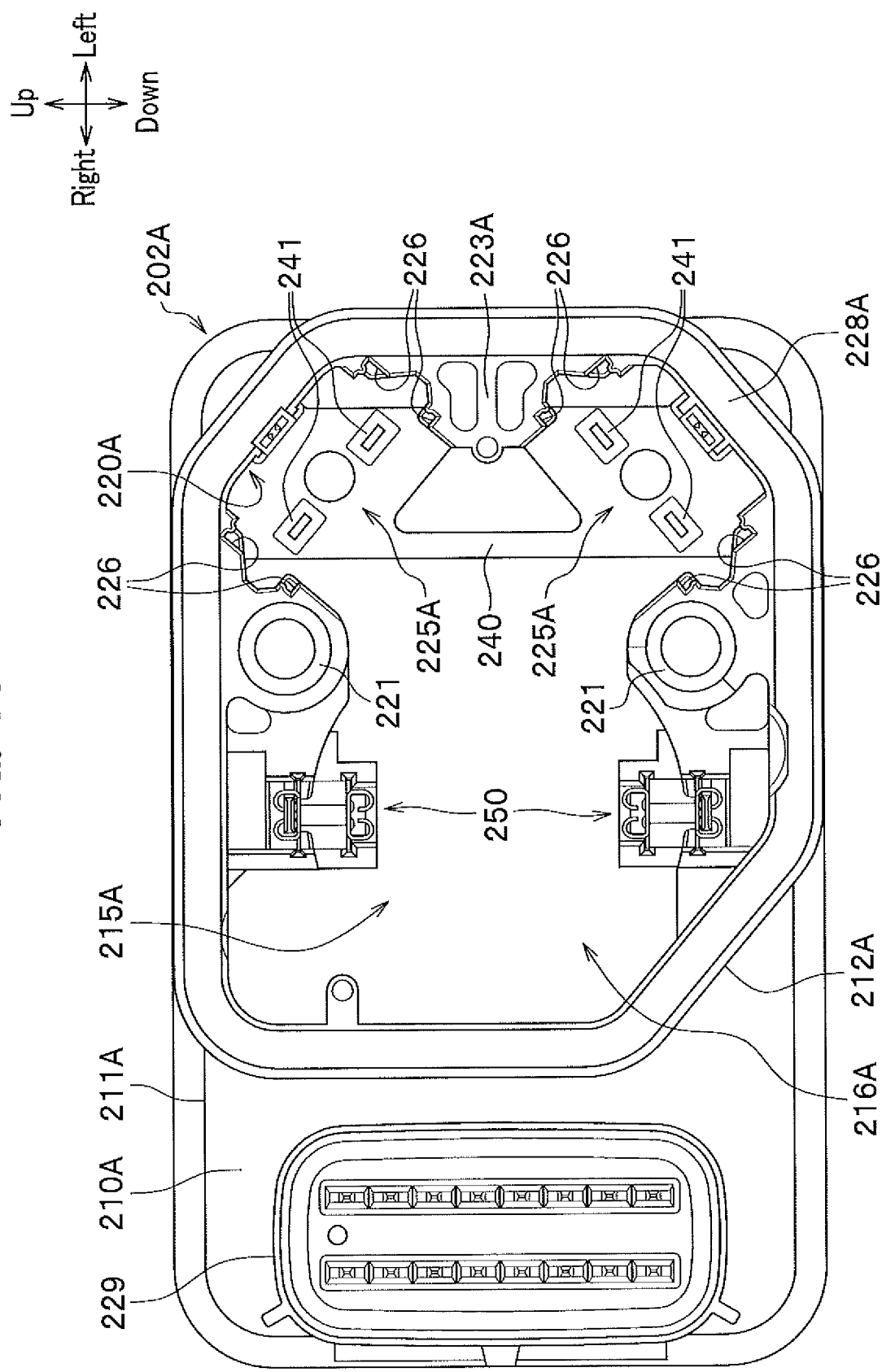
FIG. 15 is a rear view of the housing in the second embodiment.

The second peripheral wall 212A extends rearward from the rear surface of the bottom 210A, to have an outer periphery in a substantially heptagonal shape (see FIG. 15). The second peripheral wall 212A defines a second housing chamber 216A (see FIG. 11) to house therein the coil assembly 1A and the motor M. The second peripheral wall 212A is formed larger in the front-rear direction than that of the first embodiment in order to house the motor M (motor cover) larger in the axial direction (front-rear direction) than the coil assembly 1A. The first housing chamber 215A and the second housing chamber 216A communicate with each other through an opening 256 of the bottom 210A, as shown in FIGS. 11, 12, 15. In other words, no partition walls are present between the first housing chamber 215A and the second housing chamber 216A. The housing 202A has a structure having no partition walls also in the present embodiment, as described above, so that the coil assembly 1A and the motor M are disposed to run through the second housing chamber 216A into the first housing chamber 215A, as shown in FIG. 11. That is, the housing 202A effectively uses a space in the front-rear direction to house the motor M (motor cover), which is larger in the axial direction (front-rear direction) than the coil assembly 1A, so as to be reduced in size.

Figure 18A:
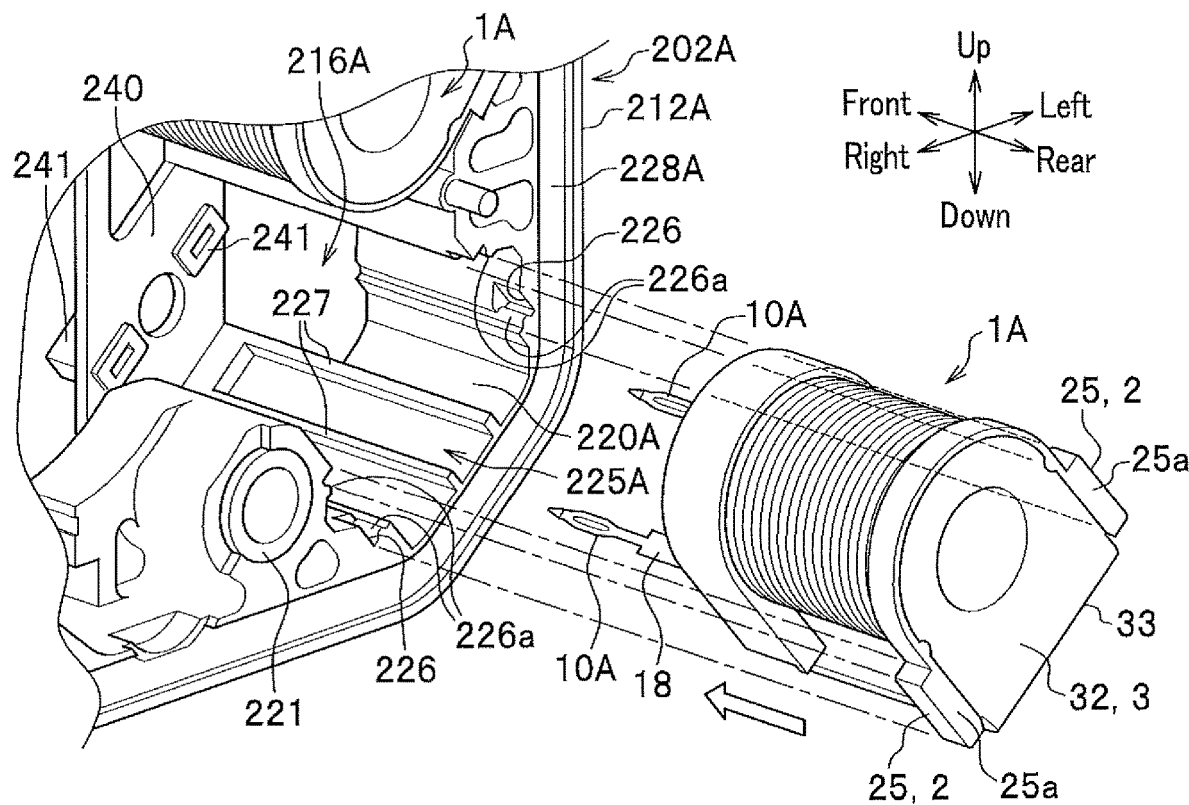
FIGS. 18A and 18B show the electrical component assembly of the second embodiment, where

The second peripheral wall 212A is formed in the inner surface thereof with a holding wall 220A in a concavo-convex shape, as shown in FIG. 15. The holding wall 220A includes the bosses 221 protruding inward from the upper and lower sides of the second housing chamber 216A, and a holding portion 223A protruding inward from the left side. The holding wall 220A defines, inside thereof, a total of two mounting spaces 225A to mount the coil assembly 1A, between the holding portion 223A and the adjacent bosses 221. The inner surface shapes of the holding walls 220A in the mounting spaces 225A are similar to those of the first embodiment, and are formed in a shape to follow the outer surface shape of the coil assembly 1A. Each mounting space 225A is provided at an opening end thereof with a pair of the grooves 226 in a concave shape to position and fix the coil assembly 1A in the mounting space 225A. The grooves 226 in each mounting space 225A are formed at opposing portions of the oppositely disposed holding wall 220A. Each groove 226 is provided with the protrusion 226a, as shown in FIG. 18A.

A terminal holder 240 in a plate shape is provided in the mounting space 225, as shown in FIG. 15. The terminal holder 240 is provided between the upper and lower holding walls 220A on the left side so as to straddle both of the mounting spaces 225A. The terminal holder 240 is provided with guides 241 having a substantially rectangular outer shape. The guide 241 is formed with an insertion hole 242 in a slit shape (see FIG. 19). The insertion holes 242 are provided at positions corresponding to the press-fit terminals 10A of the coil assembly 1A mounted in the mounting space 225A. This allows the press-fit terminals 10A to be inserted into the insertion holes 242. Note that guides 243 to support the press-fit terminals 252 are provided at the upper and lower corners of the terminal holder 240, where the press-fit terminals 252 other than those of the coil assembly 1A are insert-molded into the housing 202A (see FIG. 12).

The second peripheral wall 212A is formed at the rear end thereof with a periferal groove 228A. An adhesive to fix the housing 202A to the front surface 101A of the base body 100A is interposed in the periferal groove 228A. The housing 202A is liquid-tightly sealed to the front surface 101A of the base body 100A via an adhesive. The periferal groove 228A and the rib 25a contact the annular region indicated by the hatching line S11 and the linear regions indicated by the hatching lines S21 on both sides of the solenoid valves V1, V2 at positions corresponding to the ribs 25a, on the front surface 101A of the base body 100A in FIG. 21, in a state of the adhesive being interposed. Note that the adhesive is applied to the annular hatching line S11 and the linear hatching lines S21 in the same step. The housing 202A is attached to the base body 100A, with fixing screws (not shown), which have been inserted into the bosses 221 of the holding wall 220A of the second housing chamber 216A, being screwed into the screw holes 116 (see FIG. 13) of the base body 100A.

The lid 203 is fixed to the opening on the front surface of the housing 202A, on an opposite side from the base body 100A.

<Configuration of Coil Assembly>

Figure 16A:
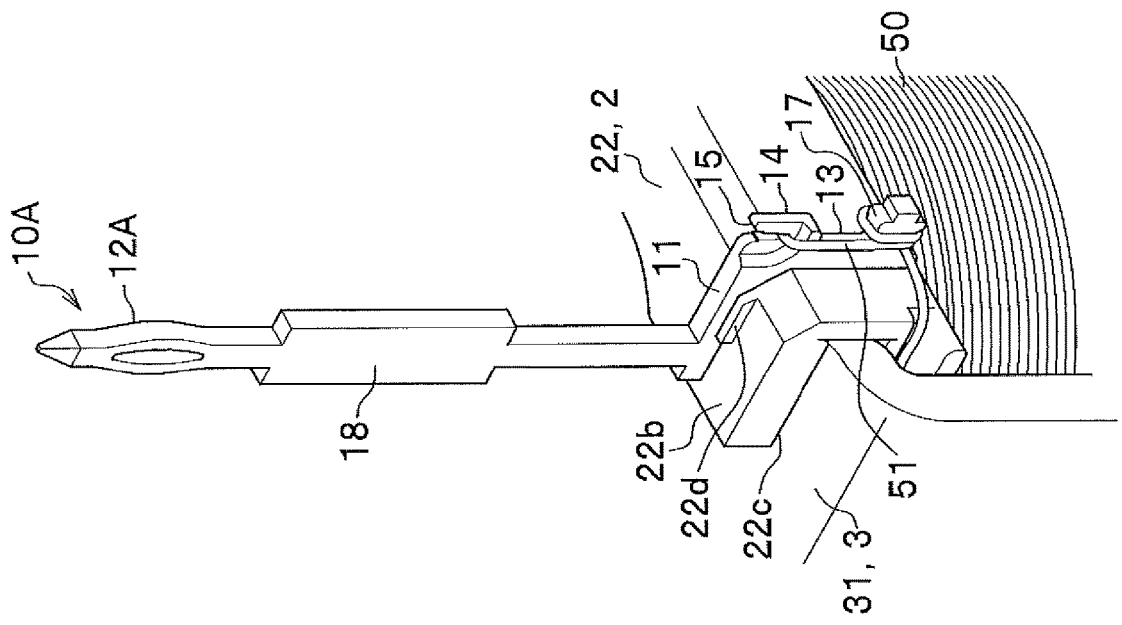
FIGS. 16A and 16B show a coil assembly of the second embodiment, where
Figure 16B:
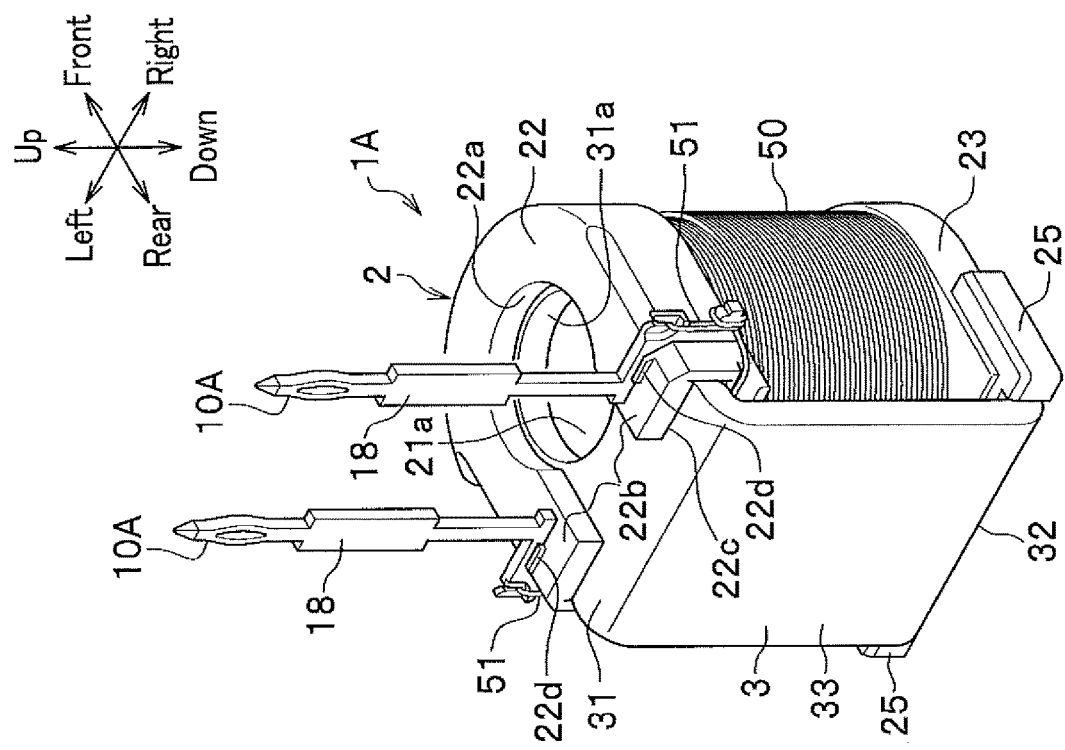

The coil assembly 1A of the present embodiment is different from the coil assembly 1 of the first embodiment on the point that the former includes a press-fit terminal 10A having a large total length, as shown in FIGS. 16, 17. There is no change in the rest of the coil assembly 1A. The press-fit terminal 10A is a metal part partially insert-molded on the terminal support 22b of the bobbin 2. A pair of the press-fit terminals 10A are disposed at a predetermined distance in the right-left direction with each other, as shown in FIG. 16A. A pair of the press-fit terminals 10A have respective ends of the winding 51 electrically connected thereto.

The press-fit terminal 10A includes the plate-like base portion 11, a terminal portion 12A protruding upward from an upper portion at one end of the base portion 11, and a connecting portion 13 protruding downward from a lower portion at the other end of the base portion 11, as shown in FIGS. 17A, 17B. The length of the terminal portion 12A is formed larger than that of the terminal portion 12 (see FIGS. 7A to 7C) of the first embodiment. The length of the terminal portion 12A is set in accordance with the dimension in the front-rear direction of the second housing chamber 216A of the housing 202A. That is, the length of the terminal portion 12A is set larger by a length of the second periferal wall 212A being largely extended in the front-rear direction as compared with the first embodiment, because the motor M is housed in the second housing chamber 216A in the present embodiment.

Figure 18B:
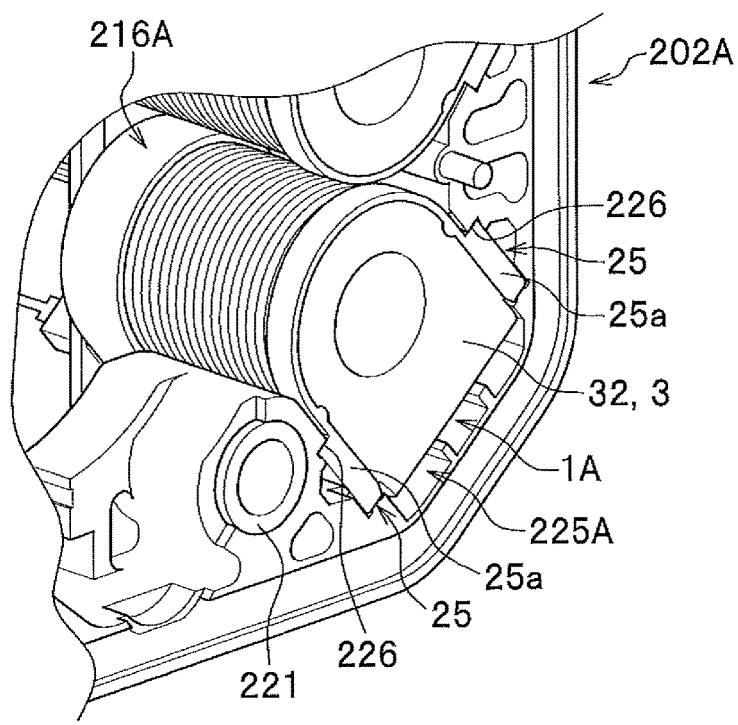
Figure 19:
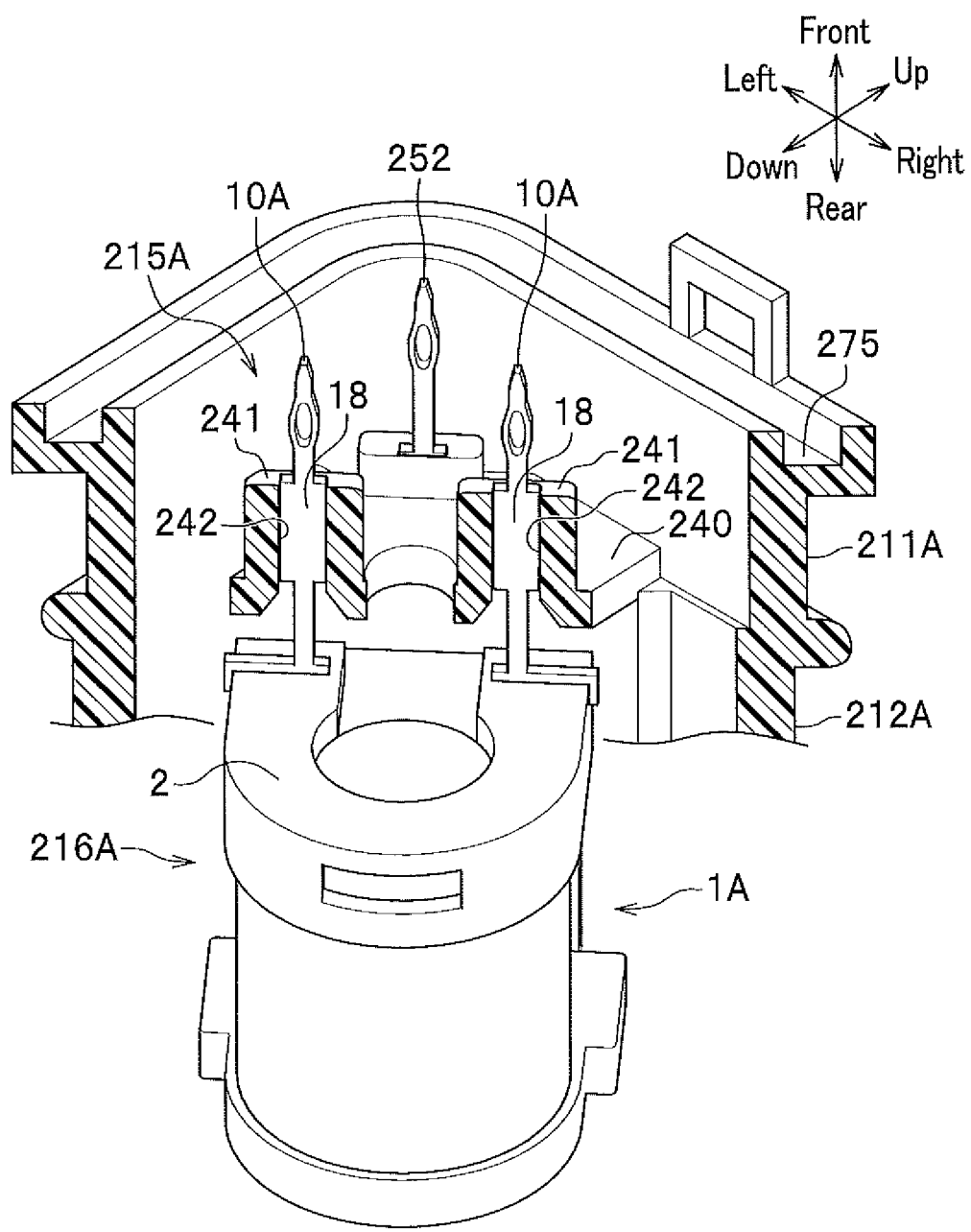
FIG. 19 is an enlarged cross-sectional view of the press-fit terminal held in a terminal holding portion of the housing.
Figure 20:
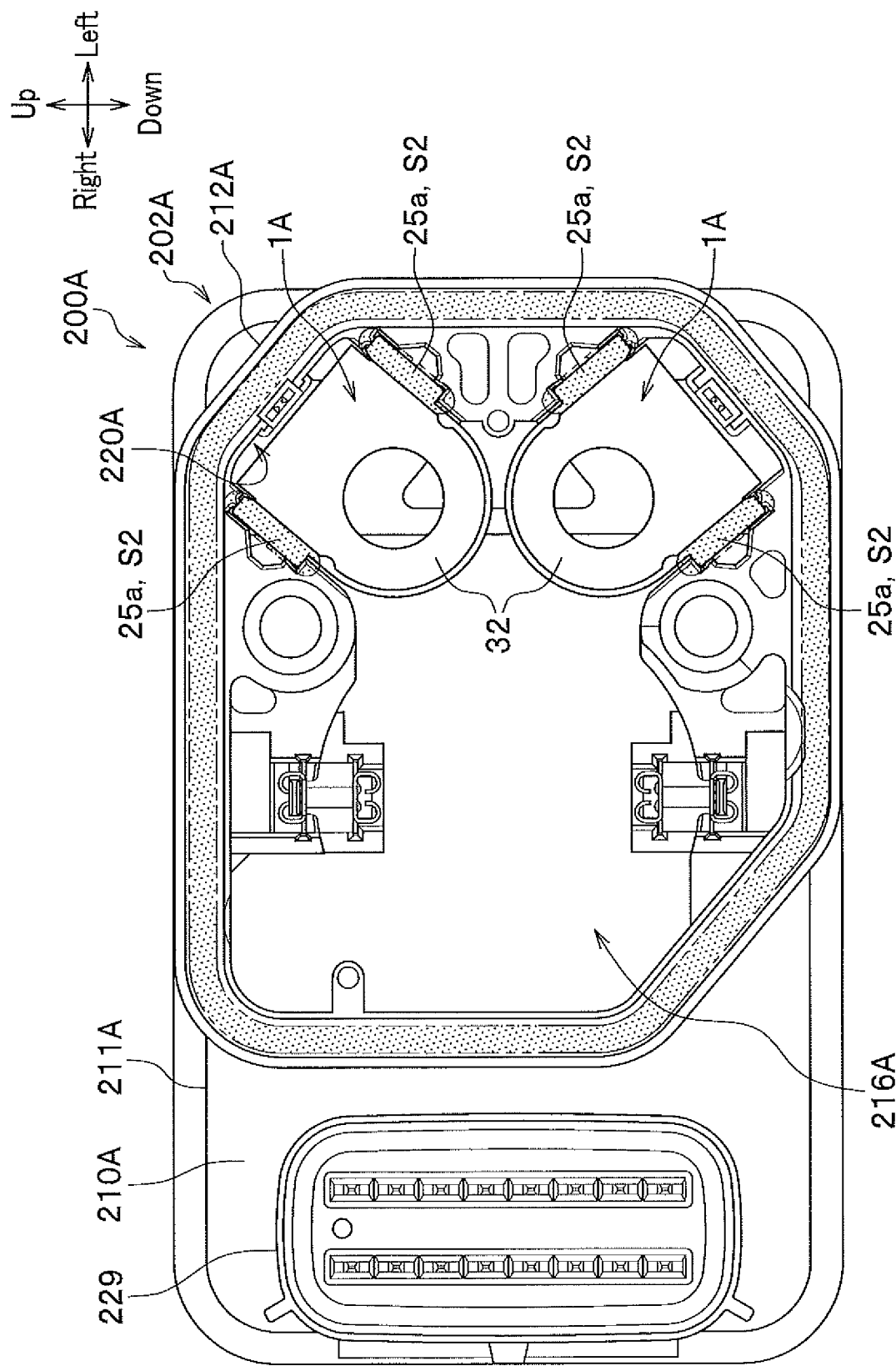
FIG. 20 is a rear view of the electrical component assembly of the second embodiment to show a housing adhesion margin and an electrical component adhesion margin.

The terminal portion 12A vertically protrudes upward (outward in the axial direction of the bobbin 2) from the top at one end of the base portion 11. The terminal portion 12A is formed in the middle portion thereof with a wide portion 18 having a wider width than the rest. In the state where the coil assembly 1A is assembled in the mounting space 225A of the housing 202A (see FIG. 18B), the wide portion 18 is held by the inner surface of the insertion hole 242 provided in the guide portion 241 of the terminal holder 240, as shown in FIG. 19. That is, the middle portion of the terminal portion 12A having a large length is held by the housing 202A via the terminal holder 240.

<Assemblying Coil Assembly to Housing>

As with the first embodiment, the coil assembly 1A is assembled to the housing 202A from behind the second housing chamber 216A, as shown in FIG. 18A. In this case, the coil assembly 1A is inserted into the mounting space 225A, with the press-fit terminal 10A oriented to the mounting space 225A and the side portion 33 of the yoke 3 oriented to the reinforcing rib 227 of the mounting space 225A. Note that the shape of the press-fit terminal 10A is simplified in FIG. 18A.

When the coil assembly 1A is inserted into the mounting space 225A, the terminal portion 12A of the press-fit terminal 10A is inserted into the insertion hole 242 in the terminal holder 240 during insertion. In this case, the terminal portion 12A can be smoothly inserted into the insertion hole 242, because a shoulder portion 18A of the wide portion 18 of the press-fit terminal 10A, on a side closer to the terminal portion 12A, has an arc-shaped chamfered shape. Then, the coil assembly 1A is further pushed in the direction of assembly, to make the ribs 25 inserted into the respective grooves 226 for press-fitting.

This press-fitting causes the coil assembly 1A to be positioned and fixed at a predetermined location in the second housing chamber 216A of the housing 202A.

<Assembling Housing to Base>

Once the coil assemblies 1A are assembled to the housing 202A, an adhesive is applied to the annular hatching line S11 and the linear hatching lines S21 on the front surface 101A of the base body 100A, which respectively correspond to the housing adhesion margin S1 in the periferal groove 228A of the housing 202A and the electrical component adhesion margins S2 on the lower surfaces 25a of the ribs 25 of the coil assemblies 1A. Then, the housing 202A is moved closer to the front surface 101A of the base body 100A to mount the coil assemblies 1A onto the solenoid valves V1, V2 protruding from the front surface 101A until the rear end of the housing 202A contacts the front surface 101A of the base body 100A. This causes the housing 202A and the coil assemblies 1A to be adhered to the front surface 101A of the base body 100A with the adhesive interposed between the base body 100A and the housing adhesion margin S1 as well as the electrical component adhesion margins S2. Then, the fixing screws 120 (see FIG. 13), which have been inserted into the bosses 221 of the holding wall 220A of the second housing chamber 216A, are screwed into the screw holes 116 (see FIG. 13) in the base body 100A. This causes the housing 202A and the coil assemblies 1A to be fixed to the front surface 101A of the base body 100A.

Also in the present embodiment, the yoke 3 is movable (in the direction orthogonal to the axial direction) with respect to the bobbin 2 fixed to the housing 202A, when the coil assemblies 1A are mounted onto the solenoid valves V1, V2. Accordingly, even if there are one or more slight positional deviations relatively between the solenoid valves V1, V2 and the coil assemblies 1A, the one or more deviations are absorbed to allow the coil assemblies 1A to be mounted onto the solenoid valves V1, V2. That is, the coil assemblies 1A are mounted, with the positional deviation(s) from the solenoid valves V1, V2 absorbed while the press-fit terminals 10A are positioned at predetermined locations.

<Assembling Control Board to Housing>

After the housing 202A is assembled to the base body 100A, the control board 201A is assembled through the opening of the first housing chamber 215A opened on the front side of the housing 202A. At the time of assembly, the throughholes 201a of the control board 201A are aligned with the front ends of the corresponding press-fit terminals 10A, and the control board 201A is pushed toward the coil assemblies 1A. Then, the terminal portions 12A of the press-fit terminals 10A are pressed into the throughholes 201a. Note that during this time, the press-fit terminal 10A is held by the terminal support portion 22b of the coil assembly 1A to maintain an upright posture on the terminal support portion 22b. Besides, the middle portion of the press-fit terminal 10A is held by the housing 202A via the terminal holder 240. Note that the press-fit terminals 251 of the bus bar terminals 250 of the housing 202A and press-fit terminals 253 of a connection portion 229 are simultaneously connected, as shown in FIG. 12, when the control board 201A is assembled.

Then, an adhesive is applied to a groove 275 (see FIG. 12), which is at a front end of the first housing chamber 215A, to liquid-tightly fix the lid 203 therein. Note that engaging portions 255 are provided at said front end, and hook portions (not shown) of the lid 203 are engaged with the engaging portions 255, to easily make alignment at the time of assembly. This completes the assembly.

The foregoing present embodiment gives the same effects as those described in the first embodiment. Additionally, the middle portion of the press-fit terminal 10A is inserted into and held by the terminal holder 240 of the housing 202A. This allows, even when the total length of the press-fit terminal 10A is large, the middle portion thereof is reliably held by the housing 202A, so that the press-fit terminal 10A is prevented from being bent and/or tipping over, to reliably connect the coil assembly 1A to the control board 201A. In addition, the coil assembly 1A is reliably connected to control board 201A, even if the control board 201A is distant from the coil assembly 1A to some extent, to have a higher degree of freedom in laying out the coil assemblies 1A in the housing 202A. Further, the press-fit terminal 10A is formed in the middle portion thereof with the wide portion 18 having a wider width than the rest. Accordingly, the middle portion of the press-fit terminal 10A is reliably held by the inner surface of the insertion hole 242 via the wide portion 18. This prevents the press-fit terminal 10A more effectively from being bent and/or tipping over.

Hereinabove, the embodiments have been described, but the present invention is not limited to the configurations described in said embodiments, and can be modified as appropriate without departing from the scope thereof. Also, the configurations of the embodiments are partly subject to addition, deletion, or replacement.

For example, the rib 25 is in a rectangular parallelepiped shape, but is not limited thereto and various shapes can be adopted. Additionally, the number of ribs per coil assembly may be single, or three or more.

In addition, the rib 25 is provided in the coil assembly 1 (1A) and the groove 226 is provided in the housing 202 (202A), but on the contrary a groove may be provided in the coil assembly 1 (1A) and a rib may be provided in the housing 202 (202A).

Further, the press fit terminal 10 (10A) is used as a connection terminal, but other press-contact terminal, such a snap-fit terminal, may be adopted as a connection terminal.

Still further, the press-fit terminal 10 is only required to have the terminal portion 12 protruding upward from the bobbin 2, and may have the connection portion 13 and the like of the press-fit terminal 10 disposed at a lateral portion of the bobbin 2 or the like.

Still further, the press-fit terminal 10 is insert-molded onto the bobbin 2, but the present invention is not limited thereto and the press-fit terminal 10 may be attached to the bobbin 2 later.

Still further, the present invention presents the coil assembly 1 (1A) as an electrical component, but can be suitably implemented also for other electrical component to be assembled to the housing 202 (202A).

Still further, the adhesive is applied to the front surface 101 (101A) of the base body 100 (100A), but may be applied first to the housing 202 (202A) and the coil assembly 1 (1A, electrical component).

The invention claimed is:

1. An electrical component assembly comprising an electrical component; and a housing in which the electrical component is assembled, wherein:
　the electrical component and the housing are fixed to a surface of a base body,
　the electrical component includes a connection terminal to be press-contacted into a throughhole of a control board provided in the housing,
　the electrical component is provided with an electrical component adhesion margin facing said surface of the base body, so as to be fixed to the base body by an adhesive interposed between the base body and the electrical component adhesion margin,
　an insertion direction of the connection terminal being inserted into the throughhole is the same as an assembly direction of the electrical component being assembled to the housing,
　the electrical component is provided on the outer surface of the housing, perpendicular to the assembly direction, with a protruding rib press-fitted into a groove of the housing, and
　the electrical component adhesion margin is formed to include at least a part of the rib.

2. The electrical component assembly as claimed in claim 1, wherein the housing includes a housing adhesion margin facing said surface of the base body, so as to be adhered to the base body via the housing adhesion margin.

3. The electrical component assembly as claimed in claim 2, wherein the connection terminal is a press-fit terminal.

4. The electrical component assembly as claimed in claim 3, wherein the electrical component is a coil configured to drive a solenoid valve, the coil assembly including:
　a bobbin;
　a coil including a winding around the bobbin; and
　a yoke attached to the bobbin;
　and wherein the connection terminal is electrically connected to the winding.

5. The electrical component assembly as claimed in claim 2, wherein the electrical component is a coil assembly configured to drive a solenoid valve, the coil assembly including:
a bobbin;
a coil including a winding around the bobbin; and
a yoke attached to the bobbin;
and wherein the connection terminal is electrically connected to the winding.

6. The electrical component assembly as claimed in claim 1, wherein the connection terminal is a press-fit terminal.

7. The electrical component assembly as claimed in claim 6, wherein the electrical component is a coil assembly configured to drive a solenoid valve, the coil assembly including:
a bobbin;
a coil including a winding around the bobbin; and
a yoke attached to the bobbin;
and wherein the connection terminal is electrically connected to the winding.

8. The electrical component assembly as claimed in claim 1, wherein the electrical component is a coil assembly configured to drive a solenoid valve, the coil assembly including:
a bobbin;
a coil including a winding around the bobbin;
a yoke attached to the bobbin;
and wherein the connection terminal is electrically connected to the winding.

9. A vehicular brake fluid pressure control device comprising the electrical component assembly as claimed in claim 8, wherein
the vehicular brake fluid pressure control device is connected between a master cylinder and a wheel brake to control brake fluid pressure acting on the wheel brake,
the solenoid valve is attached to the base body,
and the coil assembly is attached to the solenoid valve.

* * * * *